(12) United States Patent
Tominaga

(10) Patent No.: US 8,947,683 B2
(45) Date of Patent: Feb. 3, 2015

(54) PRINTING APPARATUS AND METHOD FOR CONTROLLING PRINTING APPARATUS

(75) Inventor: Masahiko Tominaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 12/400,589

(22) Filed: Mar. 9, 2009

(65) Prior Publication Data

US 2009/0225343 A1    Sep. 10, 2009

(30) Foreign Application Priority Data

Mar. 10, 2008   (JP) ................. 2008-060076

(51) Int. Cl.
| | |
|---|---|
| *G06F 3/12* | (2006.01) |
| *G06K 15/00* | (2006.01) |
| *G10L 19/00* | (2013.01) |
| *G10L 21/06* | (2013.01) |
| *H04N 1/00* | (2006.01) |
| *H04N 1/23* | (2006.01) |
| *H04N 1/32* | (2006.01) |

(52) U.S. Cl.
CPC .......... *H04N 1/00424* (2013.01); *G06F 3/1204* (2013.01); *G06F 3/1256* (2013.01); *G06F 3/1263* (2013.01); *G06F 3/1282* (2013.01); *G06F 3/1286* (2013.01); *H04N 1/00421* (2013.01); *H04N 1/00432* (2013.01); *H04N 1/0044* (2013.01); *H04N 1/00474* (2013.01); *H04N 1/00482* (2013.01); *H04N 1/00567* (2013.01); *H04N 1/00639* (2013.01); *H04N 1/233* (2013.01); *H04N 1/2338* (2013.01); *H04N 1/2369* (2013.01); *H04N 1/2392* (2013.01); *H04N 1/32112* (2013.01); *G06F 3/121* (2013.01); *G06F 3/1262* (2013.01); *G06F 2206/1514* (2013.01); *H04N 2201/0094* (2013.01); *H04N 2201/3205* (2013.01); *H04N 2201/3221* (2013.01); *H04N 2201/3222* (2013.01); *H04N 2201/3226* (2013.01); *H04N 2201/3271* (2013.01)

USPC ........ 358/1.13; 358/1.15; 358/1.16; 704/260; 704/274; 715/209

(58) Field of Classification Search
CPC .............................. G06F 3/1205; G06F 17/00
USPC .................. 358/1.15, 1.16, 1.1, 1.13; 400/61; 715/500

See application file for complete search history.

(56) References Cited

U.S. PATENT DOCUMENTS

| | | | | |
|---|---|---|---|---|
| 5,327,526 A | * | 7/1994 | Nomura et al. ............... | 358/1.16 |
| 5,528,734 A | * | 6/1996 | Sanchez ........................ | 358/1.16 |
| 6,052,198 A | * | 4/2000 | Neuhard et al. .............. | 358/1.15 |
| 6,184,996 B1 | * | 2/2001 | Gase ............................ | 358/1.15 |

(Continued)

FOREIGN PATENT DOCUMENTS

| | | |
|---|---|---|
| CN | 1945523 A | 4/2007 |
| EP | 1076311 A2 | 2/2001 |

(Continued)

*Primary Examiner* — Akwasi M Sarpong
(74) *Attorney, Agent, or Firm* — Canon U.S.A., Inc. IP Division

(57) ABSTRACT

A method for controlling a printing apparatus includes holding a plurality of jobs including a cover job having print data for a cover and a content job having print data for content, which are used in bookbinding processing, and performing control for displaying, on a display, a correspondence relationship between the cover job and the content job.

6 Claims, 19 Drawing Sheets

(56) References Cited

U.S. PATENT DOCUMENTS

| | | | |
|---|---|---|---|
| 6,509,974 B1 | 1/2003 | Hansen | |
| 6,678,068 B1* | 1/2004 | Richter et al. | 358/1.15 |
| 6,734,986 B1* | 5/2004 | Kuroi et al. | 358/1.16 |
| 6,816,273 B1* | 11/2004 | Kuga et al. | 358/1.15 |
| 6,857,796 B2* | 2/2005 | Hatayama | 400/61 |
| 6,944,412 B2* | 9/2005 | Mishima et al. | 399/81 |
| 7,113,293 B2* | 9/2006 | Mori et al. | 358/1.13 |
| 7,155,669 B1* | 12/2006 | Nakagiri et al. | 715/209 |
| 7,318,033 B2* | 1/2008 | Okutani et al. | 704/260 |
| 7,319,539 B2* | 1/2008 | Yamamura | 358/1.15 |
| 7,327,481 B2* | 2/2008 | Such et al. | 358/1.15 |
| 7,847,968 B2 | 12/2010 | Abiko | |
| 7,952,731 B2* | 5/2011 | Utsunomiya et al. | 358/1.13 |
| 8,054,487 B2* | 11/2011 | Benedetti et al. | 358/1.15 |
| 8,144,345 B2* | 3/2012 | Nishikawa | 358/1.13 |
| 2002/0051194 A1* | 5/2002 | Sakura | 358/1.15 |
| 2002/0171864 A1* | 11/2002 | Sesek | 358/1.15 |
| 2003/0112285 A1* | 6/2003 | Han | 347/14 |
| 2003/0164879 A1* | 9/2003 | Kitagawa | 348/207.2 |
| 2004/0098665 A1* | 5/2004 | Kasahara et al. | 715/500 |
| 2004/0190057 A1* | 9/2004 | Takahashi et al. | 358/1.15 |
| 2005/0088668 A1* | 4/2005 | Sesek et al. | 358/1.1 |
| 2005/0243365 A1 | 11/2005 | Noda | |
| 2006/0061793 A1* | 3/2006 | Nishikawa et al. | 358/1.13 |
| 2007/0081180 A1* | 4/2007 | Abiko | 358/1.13 |

FOREIGN PATENT DOCUMENTS

| | | |
|---|---|---|
| EP | 1772286 A | 4/2007 |
| JP | 4227537 A | 8/1992 |
| JP | 11129586 A | 5/1999 |
| JP | 2001038978 A | 2/2001 |
| JP | 2005044380 A | 2/2005 |
| JP | 2005108107 A | 4/2005 |
| JP | 2005167988 A | 6/2005 |
| JP | 2007019798 A | 1/2007 |
| JP | 2007102725 A | 4/2007 |
| JP | 2007-234037 A | 9/2007 |
| KR | 10-2007-0038920 A | 4/2007 |
| KR | 10-2009-0097128 A | 9/2009 |

* cited by examiner

FIG.8

SELECTION FOR SHEET PROCESSING TYPE

SELECT THE TYPE OF SHEET PROCESSING TO BE PERFORMED ON THE JOB TO BE PROCESSED.

| STAPLING | PUNCHING | CUTTING |

| SHIFT DISCHARGE | SADDLE STITCH BINDING | FOLDING |

| GLUING BOOKBINDING #1 (CASE BINDING) | MASS STACKING PROCESSING |

| GLUING BOOKBINDING #2 (TOP GLUING BINDING) |

| CANCEL | OK |

| RECEPTION NUMBER | DOCUMENT NAME | USER NAME | PAPER TYPE | RELATED JOB |
|---|---|---|---|---|
| 001 | DOCUMENT 1 | USER 1 | COATED PAPER | |
| 002 | COVER | USER 2 | COATED PAPER | (1) |
| 003 | MANUAL COVERED CONTENT | USER 2 | NORMAL PAPER | (1) |
| 004 | COVER | USER 2 | NORMAL PAPER | (2) |
| 005 | COVERED CONTENT | USER 2 | NORMAL PAPER | |
| 006 | SPECIFICATIONS COVERED CONTENT | USER 2 | NORMAL PAPER | (2) |

COPY  SEND  BOX  HOLD

PREVIEW  TEST-PRINT  PRINT  DELETE  EDIT

ACTIVE JOB LIST ▶

| RECEPTION NUMBER | DOCUMENT NAME | USER NAME | PAPER TYPE | CASE BINDING COVER/CONTENT INSTRUCTION METHOD | COVER JOB RECEPTION NUMBER |
|---|---|---|---|---|---|
| 001 | DOCUMENT 1 | USER 1 | COATED PAPER | | |
| 002 | COVER | USER 2 | COATED PAPER | | |
| 003 | MANUAL COVERED CONTENT | USER 2 | NORMAL PAPER | CASE BINDING (1) | 002 |
| 004 | COVER | USER 2 | NORMAL PAPER | | |
| 005 | COVERED CONTENT | USER 2 | NORMAL PAPER | | |
| 006 | SPECIFICATIONS COVERED CONTENT | USER 2 | NORMAL PAPER | CASE BINDING (3) | 004 |

PRINTING APPARATUS AND METHOD FOR CONTROLLING PRINTING APPARATUS

BACKGROUND OF THE INVENTION

1. Field of the Invention

The present invention relates to a printing apparatus and a method for controlling the printing apparatus.

2. Description of the Related Art

A conventional printing apparatus receives an input of a print job to be bound as a book from a host computer or via an operation panel of the printing apparatus. The conventional printing apparatus like this is capable of outputting a book-bound product by executing the received print job. Another type of such a conventional printing apparatus is capable of separately and independently receiving a print job including print data to be printed on a cover sheet and another print job including print data to be printed on sheets as the content, to which the cover sheet is to be attached, as mutually different print jobs during bookbinding processing.

Another conventional printing apparatus includes a function called a "job holding function". The "job holding function" refers to a function of a printing apparatus for holding a received print job on a memory until a user inputs a print instruction and executing only the print job whose print instruction has been received.

By using the job holding function, the user can input a content print job and a cover print job separately from each other into the printing apparatus to hold the input print jobs on the memory as mutually different print jobs. Furthermore, the user can issue a print instruction for executing the content print job and the cover print job held on the memory at a desired timing and perform bookbinding processing according to the print jobs with the printing apparatus.

However, when the job holding function is used, if a plurality of cover print jobs and a plurality of content print jobs are held on the memory at the same time, then the user cannot easily recognize the correspondence relationship between the cover print job and the content print job. Accordingly, when the user instructs printing of the print job held on the memory, the user may select and instruct printing of a wrong combination of a cover print job and a content print job.

SUMMARY OF THE INVENTION

According to an aspect of the present invention, a printing control apparatus includes a holding unit configured to hold a plurality of jobs including a cover job having print data for a cover and a content job having print data for content, which are used in bookbinding processing, and a display control unit configured to perform control for displaying, on a display, a correspondence relationship between the cover job and the content job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 8 illustrates an example of a screen displayed on the operation unit according to an embodiment of the present invention.

FIG. 11 illustrates an example of display control related to a job holding function according to an embodiment of the present invention.

FIG. 13 illustrates an example of a method for storing a setting related to the job holding function according to an embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
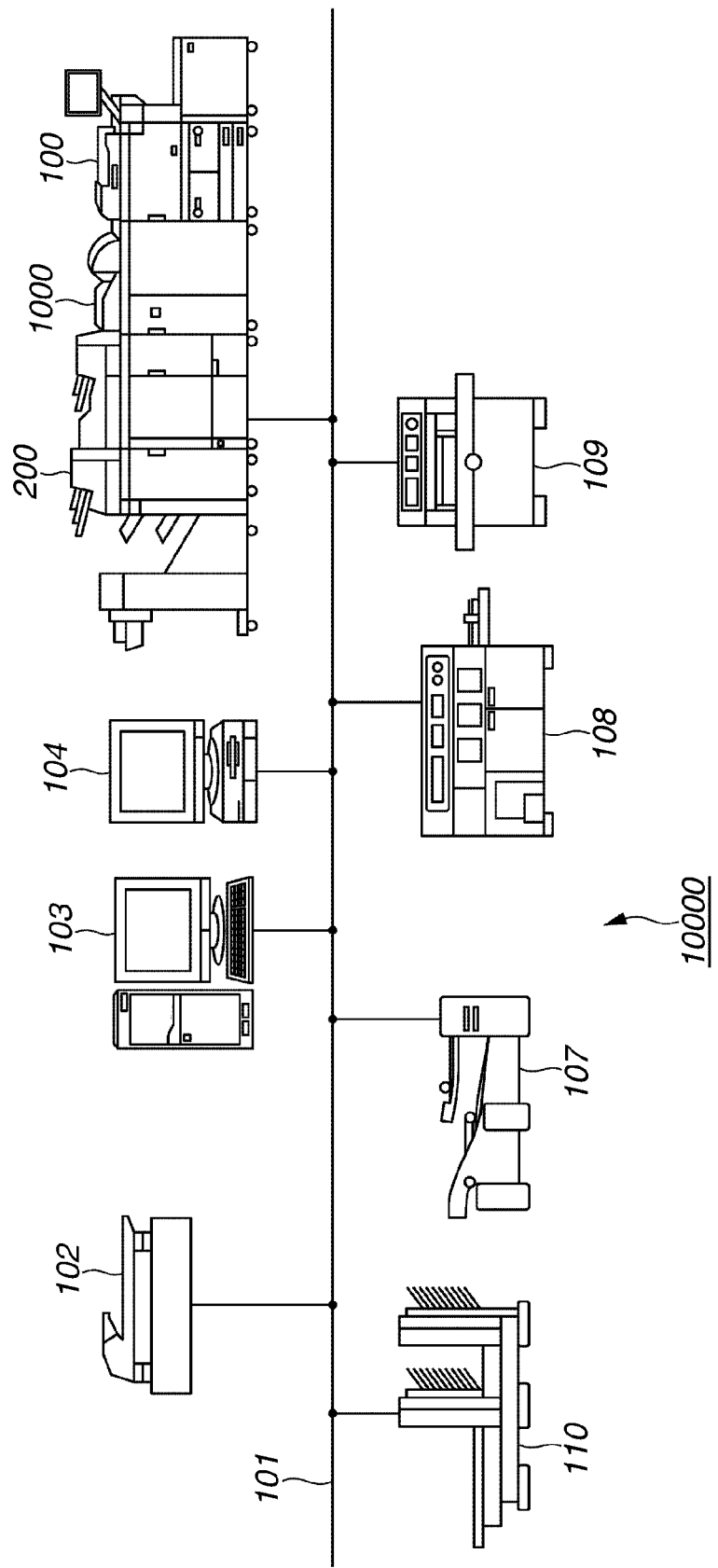
FIG. 1 illustrates an exemplary configuration of a print on demand (POD) system that includes a printing system according to an embodiment of the present invention.

Now, a first exemplary embodiment of the present invention will be described in detail below with reference to FIGS. 1 through 18. FIG. 1 illustrates an exemplary configuration of a POD system 10000 according to the present exemplary embodiment. Note here that the POD system 10000 described below is a mere example. Accordingly, it is also useful if the POD system 10000 includes components and units different from those described below.

Referring to FIG. 1, a POD system 10000 includes a printing system 1000, a scanner 102, a server computer 103 (a PC 103), and a client computer 104 (a PC 104). The printing system 1000, the scanner 102, a server computer 103 (the PC 103), and the client computer 104 (the PC 104) are in communication with one another via a network 101. Furthermore, the POD system 10000 includes a paper folding machine 107, a cutting machine 109, a saddle stitch binding machine 110, and a case binding machine 108.

The printing system 1000, which is an example of a job processing apparatus, includes a plurality of types of apparatuses, such as a printing apparatus 100 and a sheet processing apparatus 200. Note that in the present embodiment, a multifunction peripheral (MFP) having a plurality of functions, such as a copy function and a printer function, is described as an example of the printing apparatus 100. However, the present embodiment is not limited to this. That is, a printing apparatus that has a single function only, such as a copy function or a printer function, can be used as the printing apparatus 100. More specifically, any apparatus configured to form an image on a sheet (a recording material or a print paper sheet) can be used as the printing apparatus 100.

The PC 103 manages a data communication performed among various apparatuses connected to the network 101. The PC 104 sends image data to the printing apparatus 100 and the PC 103 via the network 101.

In addition, the paper folding machine 107 performs processing for folding sheets that have been printed by the printing apparatus 100. The case binding machine 108 performs processing for case-binding sheets that have been printed by the printing apparatus 100.

The cutting machine 109 performs processing for cutting sheets that have been printed by the printing apparatus 100 with respect to a sheet stack including a plurality of sheets that has been printed by the printing apparatus 100. The saddle stitch binding machine 110 performs processing for saddle-stitch binding sheets that have been printed by the printing apparatus 100.

In utilizing the paper folding machine 107, the case binding machine 108, the cutting machine 109, or the saddle stitch binding machine 110, an operator (user) takes out the sheets that have been printed by the printing apparatus 100 from the printing system 1000, sets the sheets on the apparatus that the user desires to utilize (in this case, either the paper folding machine 107, the case binding machine 108, the cutting machine 109, or the saddle stitch binding machine 110) to perform the desired processing on the apparatus set by the user to be used. Furthermore, among the plurality of apparatuses included in the POD system 10000 illustrated in FIG. 1, the apparatuses except the saddle stitch binding machine 110 are connected to the network 101. Thus, the apparatuses other than the saddle stitch binding machine 110 can perform data communications among them.

Figure 2:
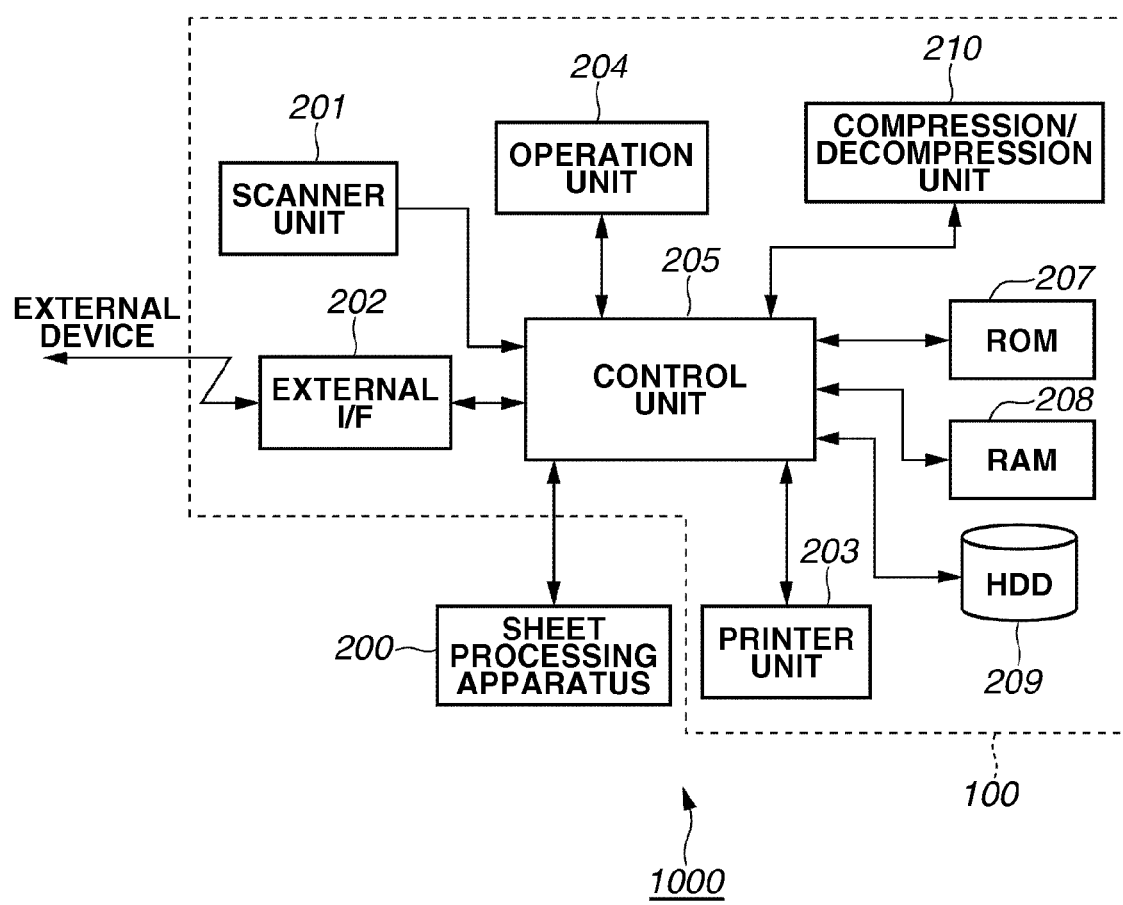
FIG. 2 illustrates an exemplary configuration of the printing system according to an embodiment of the present invention.

An exemplary configuration of the printing system 1000 is described below with reference to a system block diagram illustrated in FIG. 2. FIG. 2 illustrates an example of a configuration of the printing system 1000 according to the present exemplary embodiment. Components of the printing system 1000 except the sheet processing apparatus 200 illustrated in FIG. 2 are included in the printing apparatus 100.

Referring to FIG. 2, an arbitrary number of sheet processing apparatuses 200 can be connected to the printing apparatus 100. The printing system 1000 can perform sheet processing on the sheets that have been printed by the printing apparatus 100 with the sheet processing apparatus 200 connected to the printing apparatus 100.

The sheet processing apparatus 200 functions as a post-processing apparatus and can communicate with the printing apparatus 100. The sheet processing apparatus 200 can receive an instruction from the printing apparatus 100 to perform the sheet processing, which will be described in detail below.

The printing apparatus 100 includes a scanner unit 201, an external interface (I/F) 202, a printer unit 203, an operation unit 204, a control unit 205, a ROM 207, a RAM 208, a hard disk drive (HDD) 209, and a compression/decompression unit 210. The scanner unit 201 reads an image of an original document, converts the read image into image data, and transfers the converted image to other units.

The external I/F unit 202 sends and receives data to and from other apparatuses connected to the network 101.

The printer unit 203 prints an image based on the image data input by scanning with the scanner unit 201 on a sheet.

Figure 7:
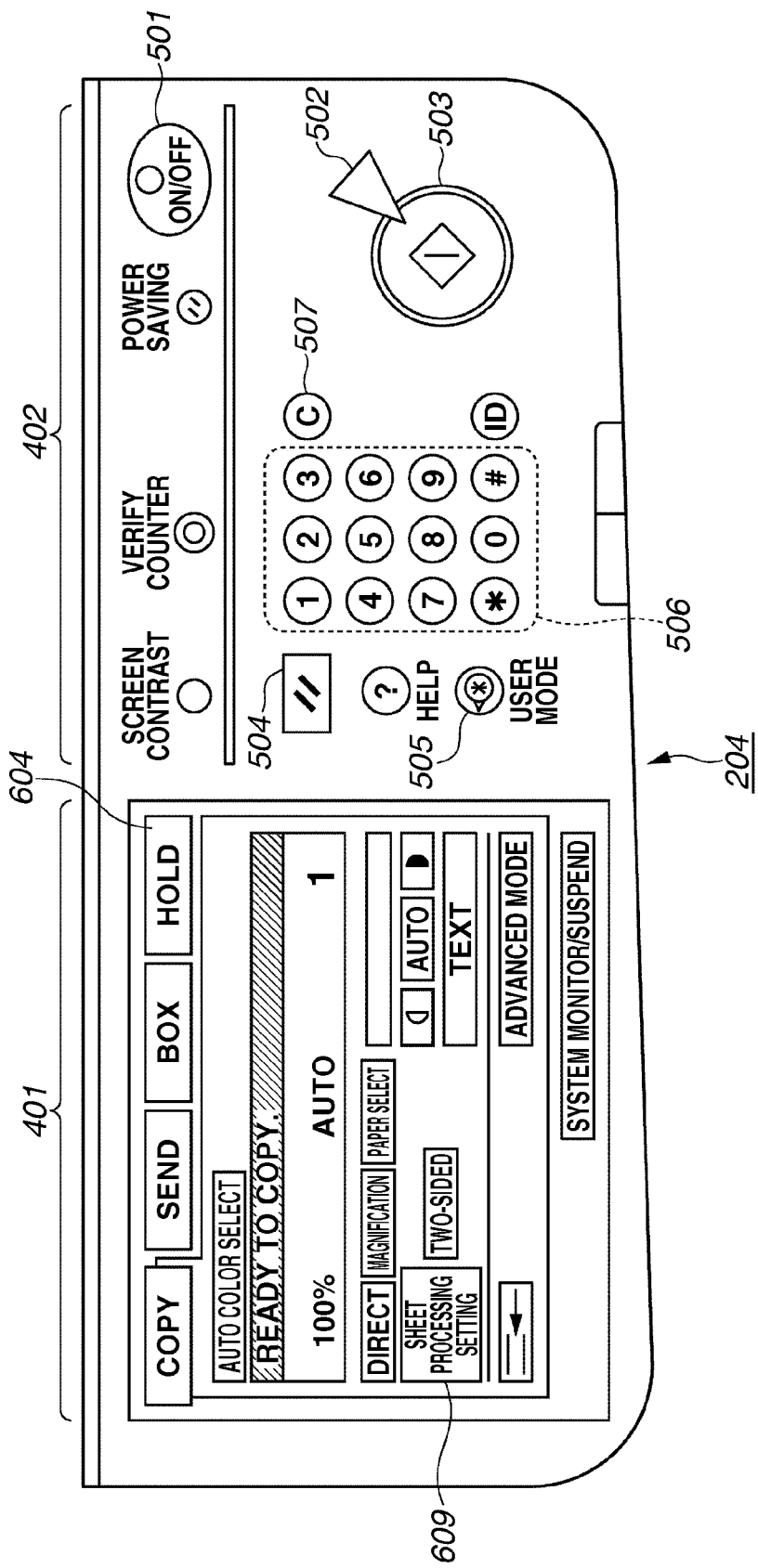
FIG. 7 illustrates an example of an operation unit according to an embodiment of the present invention.

The operation unit 204 includes a hard key input unit 402 (FIG. 7) and a touch panel 401 (FIG. 7). The operation unit 204 receives an instruction from the user operating the hard key input unit 402 and the touch panel 401. In addition, the operation unit 204 displays various types of information on the touch panel 401. The operation unit 204 will be described in detail later below with reference to FIG. 7.

The control unit 205 controls the printing system 1000 by controlling the operations of each unit of the printing system 1000. Furthermore, the control unit 205 controls the operations of the printing apparatus 100 and the sheet processing apparatus 200 connected to the printing apparatus 100.

The ROM 207 stores various programs to be executed by the control unit 205. More specifically, the ROM 207 stores, for example, a program for performing various processing illustrated in the flow charts, and a display control program for displaying various setting screens, which will be described in detail below.

In addition, the ROM 207 stores a program for performing an operation by the control unit 205 for interpreting page description language (PDL) code data received from the PC 103 or the PC 104 and rasterizing the PDL code data into raster image data. In addition, the ROM 207 stores various programs such as a system boot program and various information such as font data.

The RAM 208 is used as a work area for the control unit 205 in performing control processing. Furthermore, the RAM 208 stores information about the sheet processing apparatus 200. The information about the sheet processing apparatus 200 includes various information, such as the number (the number is an integer from 0 to n) of sheet processing apparatuses 200 that are connected to the printing apparatus 100, information about a function of the sheet processing apparatus 200, and an order of connecting a plurality of sheet processing apparatuses 200 to the printing apparatus 100, for example.

The HDD 209 includes components such as a hard disk and a driving unit for reading and writing data from and on the hard disk. The HDD 209 stores image data that has been input via the scanner unit 201 or the external I/F unit 202 and compressed by a compression/decompression unit 210 and a plurality of print jobs including a print condition for printing the image data (hereinafter also simply referred to as a "job"). The print condition includes the number of prints, the layout for the printing, and setting information for post processing executed by the sheet processing apparatus 200 or other post-processing apparatuses.

The control unit 205 can print the image data stored on the HDD 209 with the printer unit 203 according to an instruction from the user. In the present exemplary embodiment, the HDD 209 is used to implement a job holding function. The HDD 209 includes a hold queue capable of holding image data and a plurality of print jobs including the print condition for the image data. As described above, in the present exemplary embodiment, the HDD 209 implements the job holding function. However, the present invention is not limited to this. That is, the job holding function can be implemented by the RAM 208.

The compression/decompression unit 210 performs compression and decompression processing on image data stored in the RAM 208 and the HDD 209 based on various compression formats, such as Joint Bi-level Image Experts Group (JBIG) or Joint Photographic Experts Group (JPEG).

Figure 3:
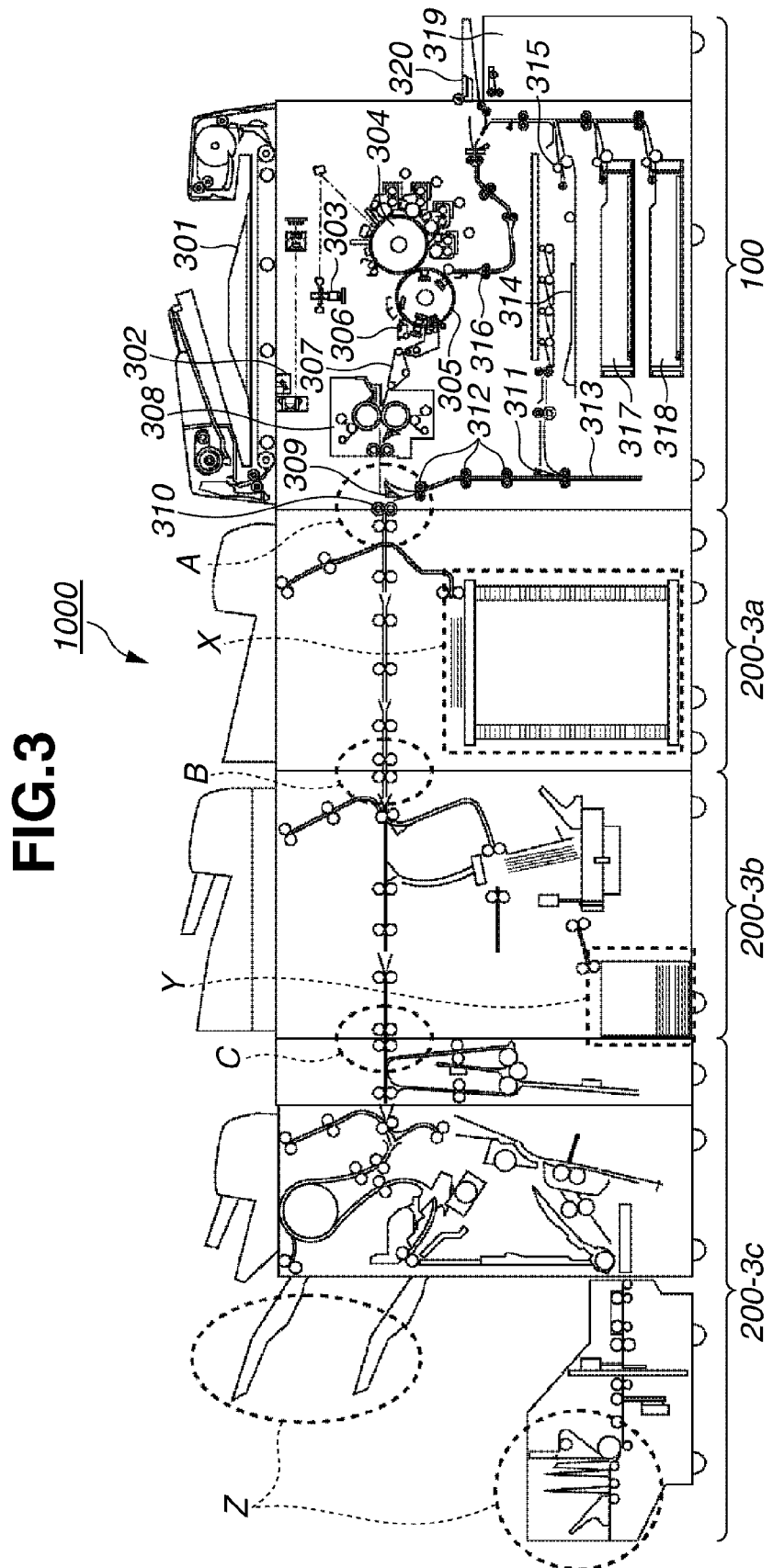
FIG. 3 illustrates an exemplary configuration of the printing system according to an embodiment of the present invention.

An exemplary configuration of the printing system 1000 is described below with reference to FIG. 3. FIG. 3 is a cross section that illustrates an example of the printing apparatus 100 and the sheet processing apparatus 200 according to the present embodiment.

Referring to FIG. 3, the printing apparatus 100 includes an auto document feeder (ADF) 301, a scanner 302, a rotating polygonal mirror 303, a photosensitive drum 304, a transfer drum 305, a separation claw 306, a pre-fixing conveyance unit 307, a fixing device 308, a sheet discharge flapper 309, a paper discharge roller 310, a two-sided conveying unit, a paper re-feed roller 315, a registration roller 316, paper cassettes 317 and 318, a paper feed deck 319, and a manual feed tray 320. The ADF 301 separates a document bundle set on a stacking surface of a document tray page by page from the first page. Then, the ADF 301 feeds the document onto a document mounting glass to scan the document with the scanner 302.

The scanner 302 reads an image on the document that has been conveyed onto the document mounting glass and converts the read document image into image data with an image sensor, such as a charge-coupled device (CCD).

A ray, such as a laser beam, which has been modulated according to the image data, is made incident on the rotating polygonal mirror 303. The ray reflected from the rotating polygonal mirror 303 then falls on the surface of the photosensitive drum 304 via a reflection mirror as reflection scanning light to form a latent image on the surface of the photosensitive drum 304.

The latent image formed on the surface of the photosensitive drum 304 with the ray is then developed with toner. The toner image thus formed is transferred onto the sheet conveyed and attached onto the surface of the transfer drum 305.

By serially performing a series of image forming processing on toners of colors of yellow (Y), magenta (M), cyan (C), and black (K), a full color image is formed. After performing four-image forming processing, a sheet on the transfer drum 305, onto which a full color image has been formed, is then separated from the transfer drum 305 by the separation claw 306. Then, the separated sheet is conveyed to the fixing device 308 by the pre-fixing conveyance unit 307.

The fixing device 308 includes rollers and a belt in combination with one another. Furthermore, the fixing device 308 includes therein a heat source such as a halogen heater. The fixing device 308 applies heat and pressure to the toner on the sheet having the transferred toner image. Thus, the toner on the sheet having the toner image is fused and fixed.

The sheet discharge flapper 309 can swing around an axis. The sheet discharge flapper 309 swings to regulate a direction of conveying a sheet. When the sheet discharge flapper 309 swings clockwise in FIG. 3, the sheet is conveyed in a straight direction. Then, the sheet is conveyed to the paper discharge roller 310 and is then discharged out of the printing apparatus 100 by the paper discharge roller 310.

On the other hand, in forming images on both sides of the sheet (two-sided printing), the sheet discharge flapper 309 swings counterclockwise in FIG. 3 to change the path for conveying the sheet to a downward direction. Thus, the sheet is conveyed to a two-sided conveyance unit. The two-sided conveyance unit includes the reversal flapper 311, the reversal roller 312, the reversal guide 313, and the two-sided tray 314.

The reversal flapper 311 swings around an axis and regulates the direction of conveying the sheet. In performing a two-sided print job, the control unit 205 performs the following control. That is, the control unit 205 performs control so that the reversal flapper 311 swings counterclockwise in FIG. 3 to convey the sheet, whose first surface has been already printed with the printer unit 203, into the reversal guide 313 via the reversal roller 312.

Then, the control unit 205 temporarily stops the reversal roller 312 in the state where a trailing edge of the sheet is pinched by the reversal roller 312. Then, the control unit 205 allows the reversal flapper 311 to swing counterclockwise in FIG. 3. Furthermore, the control unit 205 allows the reversal roller 312 to rotate in a reverse direction.

As described above, the control unit 205 performs control so that the sheet is switched back to be conveyed. The control unit 205 performs control to guide the sheet to the two-sided tray 314 in the state where the leading edge and trailing edge of the sheet have been changed in position.

The two-sided tray 314 temporarily stacks the sheet that has been conveyed thereto as described above. Then, the sheet temporarily stacked on the two-sided tray 314 is conveyed into the printing apparatus 100 again to a registration roller 316 by the paper re-feed roller 315. At this time, the sheet is fed with a surface thereof opposite to the first surface used in the transfer processing facing the photosensitive drum 304.

Then, the control unit 205 performs control to form an image on the second surface of the sheet as in the processing described above.

Thus, images are formed on both sides of the sheet. Then, the sheet having the image formed thereon is subjected to fixing processing. After that, the sheet having the image fixed thereon is conveyed to the paper discharge roller 310 again and discharged to the outside of the printing apparatus 100 via the paper discharge roller 310.

In addition, the printing apparatus 100 includes a paper feed unit that stacks sheets to be used in the print processing. As the paper feed unit, the paper cassettes 317 and 318, the paper feed deck 319, and the manual feed tray 320 are used in the present embodiment. Each of the paper cassettes 317 and 318 can stack five hundred sheets, for example, while the paper feed deck 319 can stack five thousand sheets, for example.

Here, various types of sheets of different sizes and materials can be respectively set in each paper feed unit on the paper cassettes 317 and 318 and the paper feed deck 319. Furthermore, in the manual feed tray 320, various types of sheets including a special sheet, such as an overhead projector (OHP) sheet, can be set.

Each of the paper feed cassettes 317 and 318, the paper feed deck 319, and the manual feed tray 320 includes a paper feed roller. The sheets stacked on the paper feed unit are serially fed by the paper feed roller sheet by sheet.

Now, the sheet processing apparatus 200 connected to the printing apparatus 100 illustrated in FIG. 3 will be described below.

An arbitrary number of different types of sheet processing apparatuses 200 in the printing system 1000 according to the present embodiment can be connected in tandem as long as sheets can be conveyed from the sheet processing apparatus 200 on the upstream side to the sheet processing apparatus 200 on the downstream side via a sheet conveyance path. In this regard, for example, the sheet processing apparatuses 200 can be connected to the printing apparatus 100 in order of a large-capacity stacker 200-3*a*, a gluing binding machine 200-3*b*, and a saddle stitch binding machine 200-3*c*, in order of increasing distance from the printing apparatus 100, as illustrated in FIG. 3. The large-capacity stacker 200-3*a*, the gluing binding machine 200-3*b*, and the saddle stitch binding machine 200-3*c* can be selectively used by the printing system 1000.

Furthermore, each of the sheet processing apparatus 200 includes a sheet discharge unit. The operator can take out the sheet that has been already subjected to the above-described sheet processing from the sheet discharge unit of each of the sheet processing apparatuses 200.

The control unit 205 performs the following processing for controlling the sheet processing apparatus 200 connected to the printing apparatus 100 according to an instruction from the operator.

For example, if the operator has operated the operation unit 204 and thus issued an instruction for performing processing for stacking a large number of sheets to perform a print job, the control unit 205 performs the processing for printing the sheet for the instructed print job with the printing apparatus 100. Then, the control unit 205 stacks a large amount of printed sheets in the large-capacity stacker 200-3*a* connected to the printing apparatus 100.

On the other hand, if the operator has operated the operation unit 204 and thus issued an instruction for performing case binding processing, the control unit 205 performs processing for printing on the sheet for the print job with the printing apparatus 100. Then, the control unit 205 performs the case binding processing on the printed sheets with the gluing binding machine 200-3*b* connected to the printing apparatus 100.

Note that the setting for the case binding processing can be performed via a screen displayed on a display unit of the PC 103 or the PC 104. The control unit 205 performs case binding processing according to the condition set via the screen.

Furthermore, if the operator has operated the operation unit 204 and issued an instruction for performing top gluing binding processing, then the control unit 205 performs the processing for printing on the sheet for the print job with the printing apparatus 100 and then performs the top gluing binding processing on the printed sheet with the gluing binding machine 200-3*b*, which is connected to the printing apparatus 100.

Furthermore, if the operator has operated the operation unit 204 and issued an instruction for performing saddle stitch binding processing, the control unit 205 performs the processing for printing on the sheet for the print job with the printing apparatus 100. Then, the control unit 205 performs stapling processing instructed by the operator on the printed sheets with the saddle stitch binding machine 200-3*c* connected to the printing apparatus 100.

Similarly, if the operator has operated the operation unit 204 and issued an instruction for performing either of punching processing, cutting processing, and folding processing, the control unit 205 performs the sheet processing instructed by the operator with the saddle stitch binding machine 200-3*c* connected to the printing apparatus 100.

The control unit 205 receives a request for performing sheet processing desired by the operator, of candidates for sheet processing that can be performed with the sheet processing apparatus 200 connected to the printing apparatus 100, together with a print request issued by the operator via the operation unit 204.

When the control unit 205 receives the request for printing the job to be subjected to the instructed sheet processing via the operation unit 204, the control unit 205 performs the print processing requested in the print job on the sheet with the printer unit 203.

Then, the control unit 205 performs control for conveying the sheet that has been printed in the print job to the sheet processing apparatus 200 that can perform the sheet processing desired by the user via the sheet conveyance path, to perform the requested sheet processing with the sheet processing apparatus 200.

Here, suppose, in the printing system 1000 having the configuration illustrated in FIG. 3, that the user has instructed the control unit 205 via the operation unit 204 to perform processing for stacking a large amount of sheets with the large-capacity stacker 200-3*a* with respect to the print job to be subjected to the sheet processing desired by the user (in this case, the processing for stacking a large amount of sheets) whose request for printing has been issued by the user. The job like this is hereinafter simply referred to as a "stacker job".

When the stacker job is processed in the system having the configuration illustrated in FIG. 3, the control unit 205, at first, allows the sheet in the job that has been printed with the printing apparatus 100 to pass a point A in FIG. 3 and to be conveyed into the large-capacity stacker 200-3*a*. After that, the control unit 205 performs the stacking processing in the job with the large-capacity stacker 200-3*a*.

Then, the control unit 205 allows the print product of the job on which the stacking processing has been performed with the large-capacity stacker 200-3*a* to be held in a paper discharge destination X in the large-capacity stacker 200-3*a*, without conveying the print product to another apparatus (for example, an apparatus downstream to the large-capacity stacker 200-3*a*).

The operator can take out the print product of the stacker job that is held in the paper discharge destination X in FIG. 3 directly from the paper discharge destination X. Accordingly, a series of operations of the apparatuses and the operator's operation including conveyance of the sheet to a paper discharge destination Z at the most downstream position in the sheet conveyance direction in FIG. 3 and taking out of the print product of the stacker job from the paper discharge destination Z become unnecessary.

In addition, suppose that the job to be processed whose request for printing has been received from the operator in the system configuration in FIG. 3 is a job that has been instructed to be subjected to sheet processing (for example, gluing binding processing, such as case binding processing or top gluing binding) with the gluing binding machine 200-3*b*. That job is herein referred to as a "gluing binding job".

In performing the gluing binding job in the system having the configuration illustrated in FIG. 3, the control unit 205, at first, allows a sheet printed with the printing apparatus 100 to be conveyed into the inside of the gluing binding machine 200-3*b* via points A and B in FIG. 3. After that, the control unit 205 performs the gluing binding processing of the job with the gluing binding machine 200-3*b*.

After the gluing binding processing for the job with the gluing binding machine 200-3*b* is completed, the control unit 205 allows the print product of the job on which the gluing binding processing has been performed with the gluing binding machine 200-3*b* to be held in a paper discharge destination Y in the gluing binding machine 200-3*b*, without conveying the print product to another apparatus (for example, an apparatus downstream to the gluing binding machine 200-3*b*).

Furthermore, for example, suppose, in the printing system 1000 having the configuration illustrated in FIG. 3, that a job to be processed whose request for printing has been received from the operator is a job that has been instructed to be subjected to sheet processing with the saddle stitch binding machine 200-3*c*.

Here, the sheet processing performed with the saddle stitch binding machine 200-3*c* includes, for example, saddle stitch binding processing, punching processing, cutting processing, shift discharge processing, and folding processing. The job like this is hereinafter collectively and simply referred to as a "saddle stitch binding job".

In processing the saddle stitch binding job with the system configuration in FIG. 3, the control unit 205 allows a sheet used in the job printed with the printing apparatus 100 to pass points A, B, and C in FIG. 3 to be conveyed to the saddle stitch binding machine 200-3*c*. After that, the control unit 205 performs the sheet processing of the job with the saddle stitch binding machine 200-3*c*.

After the saddle stitch binding processing for the job with the saddle stitch binding machine 200-3*c* is completed, the control unit 205 allows the print product of the saddle stitch binding job that has been subjected to the sheet processing with the saddle stitch binding machine 200-3*c* to be held in the paper discharge destination Z in the saddle stitch binding machine 200-3*c*.

Note that in the present embodiment, the paper discharge destination Z includes a plurality of paper discharge destination options. With the plurality of paper discharge destination options, the saddle stitch binding machine 200-3*c* can perform a plurality of types of sheet processing in which different discharge destinations are used for respective types of sheet processing.

As described above with reference to FIGS. 1 through 3, in the printing system 1000 according to the present embodiment, a plurality of sheet processing apparatuses 200 can be connected to the printing apparatus 100. The plurality of sheet processing apparatuses 200 can be connected to the printing apparatus 100 in an arbitrary combination thereof.

Furthermore, the order of connection of the plurality of sheet processing apparatuses 200 to the printing apparatus 100 can be freely determined or changed as long as the sheet conveyance paths provided among the sheet processing apparatuses 200 can be continuously provided. Furthermore, a plurality of different types of sheet processing apparatuses 200 can be used as the sheet processing apparatuses that can be connected to the printing apparatus 100.

Now, an exemplary inner configuration of the sheet processing apparatus 200 that can be connected to the printing apparatus 100 according to the present embodiment is described with reference to FIGS. 4 through 6.

To begin with, an exemplary inner configuration of the large-capacity stacker 200-3*a* (FIG. 3) is described with reference to the cross section in FIG. 4. FIG. 4 is a cross section illustrating an example of a configuration of the large-capacity stacker 200-3*a* according to the present exemplary embodiment.

Figure 4:
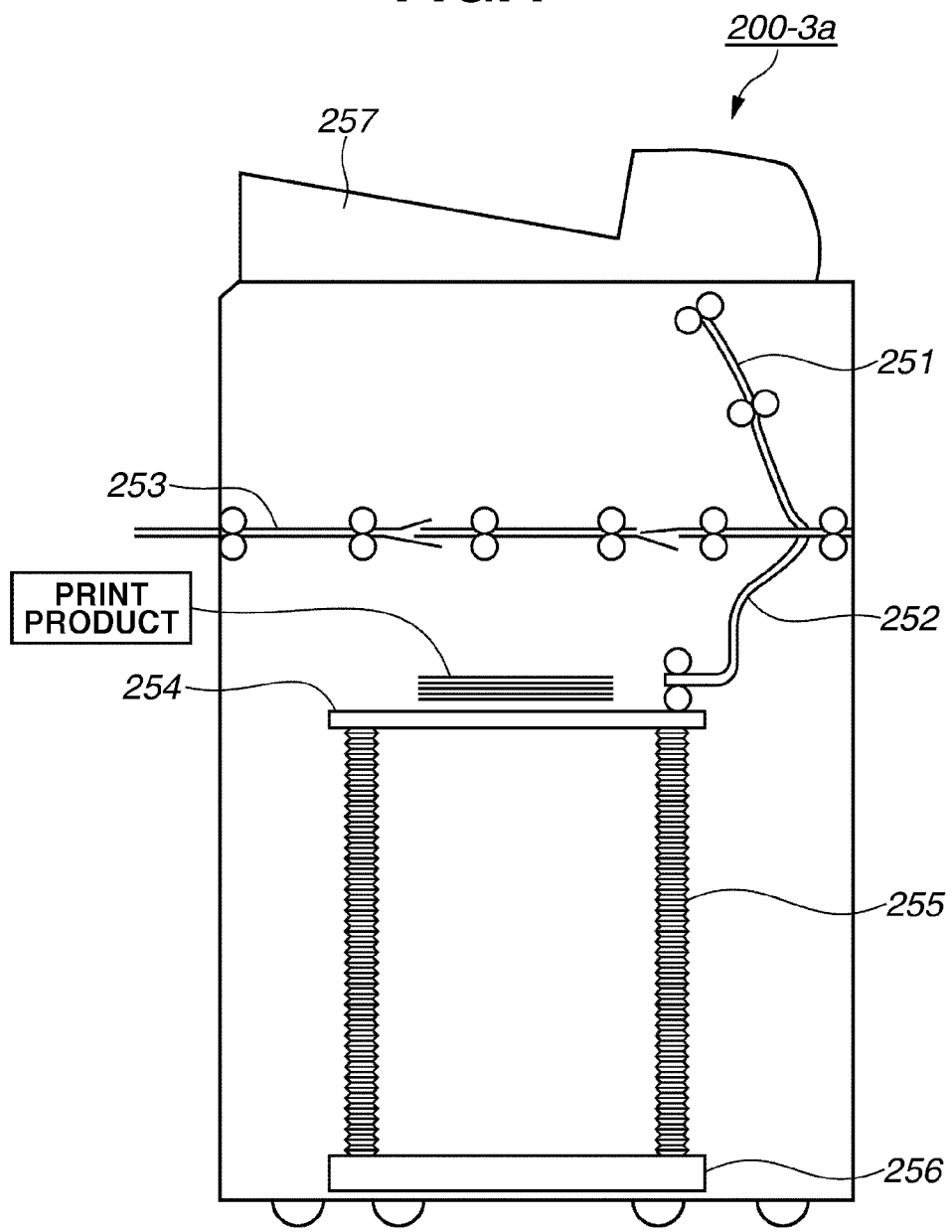
FIG. 4 illustrates an example of an inner configuration of an inline finisher according to an embodiment of the present invention.

Referring to FIG. 4, the large-capacity stacker 200-3*a* conveys the sheet that has been conveyed from an upstream apparatus selectively into three conveyance paths. The three conveyance paths include a sample tray path 251, a stack path 252, and a straight path 253.

The stack path 252, which is included in the large-capacity stacker 200-3*a*, is a sheet conveyance path for conveying the sheet onto a stack tray 254.

The stack tray 254 is a stacking unit that is provided above an extendable stay 255. A detachable cart 256 is provided below the extendable stay 255. An operator can easily carry the sheet that has been stacked on the stack tray 254 by using the detachable cart 256.

Here, if the operator has operated the operation unit 204 to issue a request for performing a job for starting processing for stacking the sheet with the large-capacity stacker 200-3*a*, the control unit 205 performs control for conveying the sheet that has been printed with the printing apparatus 100 into the stack path 252 of the large-capacity stacker 200-3*a* and discharging the sheet on the stack tray 254 via the stack path 252.

The straight path 253 of the large-capacity stacker 200-3*a* is a sheet conveyance path for conveying, to an apparatus in a subsequent stage, the sheet used in the job that does not require processing for stacking the sheet on the stack tray 254 of the large-capacity stacker 200-3*a*.

The sample tray path 251 is a sheet conveyance path for discharging the sheet onto a sample tray 257. The straight path 253, the sample tray path 251, and the sample tray 257 are used to provide an easy access to a print product by making it unnecessary for the operator to take out the print product from the stack tray 254. In this case, the control unit 205 performs control for conveying the sheet that has been printed with the printing apparatus 100 onto the sample tray path 251 and discharging the sheet onto the sample tray 257 via the sample tray path 251.

Note that a plurality of sheet detection sensors (not illustrated), which is used to detect a status of conveyance of the sheet and paper jamming, if any, is provided in the sheet conveyance path in the large-capacity stacker 200-3*a*.

In addition, the large-capacity stacker 200-3*a* includes a central processing unit (CPU) (not illustrated). The CPU of the large-capacity stacker 200-3*a* notifies the control unit 205 of information about sheet detection, which has been sent from each sensor to the control unit 205 via a signal line used for performing data communication. The control unit 205 can recognize the state of sheet conveyance and the occurrence of jamming in the large-capacity stacker 200-3*a* according to the information from the large-capacity stacker 200-3*a*.

Note here that if another sheet processing apparatus 200 is provided and connected between the large-capacity stacker 200-3*a* and the printing apparatus 100, then a CPU (not illustrated) of the sheet processing apparatus 200 provided between the large-capacity stacker 200-3*a* and the printing apparatus 100 notifies the information from the sensor of the large-capacity stacker 200-3*a* to the control unit 205.

Now, an exemplary inner configuration of the gluing binding machine 200-3*b* will be described below with reference to the cross section in FIG. 5. FIG. 5 is a cross section illustrating an example of a configuration of the gluing binding machine 200-3*b* according to the present exemplary embodiment. Referring to FIG. 5, the gluing binding machine 200-3*b* conveys the sheet that has been conveyed from an upstream apparatus selectively into either one of three conveyance paths, namely, a cover path 261, a contentblock path 262, or a straight path 263.

In addition, the gluing binding machine 200-3b includes an inserter path 264. The inserter path 264 is a sheet conveyance path used for conveying the sheet that has been set on an inserter tray 265 into the cover path 261.

The straight path 263 of the gluing binding machine 200-3b is a sheet conveyance path used for conveying, to an apparatus in a subsequent stage, the sheet used in the job that does not require the gluing binding processing with the gluing binding machine 200-3b.

Furthermore, each of the contentblock path 262 and the cover path 261 of the gluing binding machine 200-3b is a sheet conveyance path used for conveying the sheet necessary for generating a case-bound print product.

For example, in generating one case-bound print product using the gluing binding machine 200-3b, the control unit 205 performs control for printing image data for the content that is to be printed on a sheet for the content of the case-bound print product with the printer unit 203. In generating one case-bound print product, a sheet stack for one book including sheets for the content is covered with one cover sheet. The sheet stack for the content used in case binding is herein referred to as a "contentblock". The content may include or consist of text and/or one or more images.

The control unit 205 performs control for conveying the sheet that has been printed with the printing apparatus 100, which is to be the contentblock, into the contentblock path 262.

Then, in performing the case binding processing, the control unit 205 performs processing for binding the contentblock sheets that have been printed with the printing apparatus 100 with the cover sheet which has been conveyed via the cover path 261.

Figure 5:
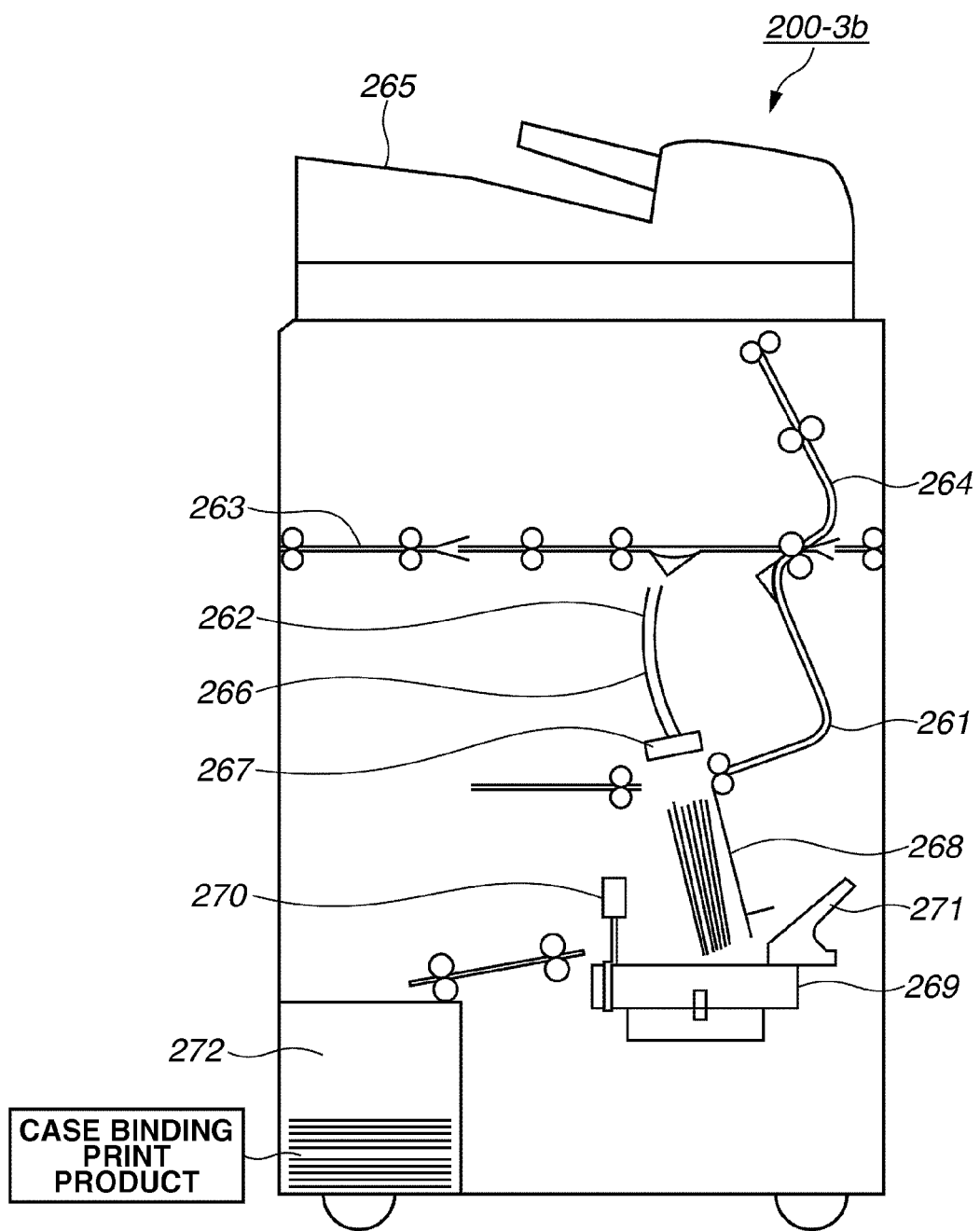
FIG. 5 illustrates an example of an inner configuration of the inline finisher according to an embodiment of the present invention.

For example, the control unit 205 allows the contentblock sheets conveyed from an upstream apparatus to be serially stacked in a stacking unit 266 via the contentblock path 262 illustrated in FIG. 5. When the sheets onto which the contentblock data is printed are stacked on the stacking unit 266 in an amount equivalent to the number of sheets for one book, the control unit 205 allows one sheet used for the cover required in the job to be conveyed via the cover path 261. It is useful if the cover sheet set on the inserter tray 265 is conveyed into the cover path 261 via the inserter path 264 or if the cover printed by the printing apparatus 100 is conveyed into the cover path 261. The operator can change the setting as to which of the above-described method for providing the cover is to be used.

In parallel to the above-described operation, the control unit 205 performs control for gluing a spine portion of one set of the sheet stack, which have been stacked on the stacking unit 266 and are to be used for the contentblock, with a gluing unit 267.

After that, the control unit 205 controls the gluing unit 267 so that the gluing unit 267 attaches the spine portion of the contentblock to a central portion of the cover sheet. In attaching the contentblock to the cover, the contentblock is conveyed while being pushed towards a lower portion of the gluing bookbinding machine 200-3b.

Thus, the control unit 205 performs processing for folding the cover sheet to wrap the contentblock with one cover sheet. Subsequently, one set of sheet stack is stacked on a turntable 269 along a guide 268.

After one set of sheet stack has been set on the turntable 269, the control unit 205 can perform three-edge cutting processing with a cutter unit 270. Here, the three-edge cutting processing refers to processing for cutting three edges of the sheet stack for one set of a book except the spine portion thereof.

More specifically, the control unit 205 performs control for rotating the sheet stack by 90 degrees with the turntable 269 every time the cutting processing for cutting one edge of the sheet stack is performed. When the cutting processing for cutting one edge of the sheet stack is performed on three different edges thereof, the three-edge cutting processing is completed.

Then, the control unit 205 performs control for pressing the sheet that has been subjected to the three-edge cutting processing against a basket 272 with a pressing portion 271. Thus, the sheet stack is stored in the basket 272. By performing the above-described processing, the present exemplary embodiment can output a case-bound print product.

Now, an exemplary inner configuration of the saddle stitch binding machine 200-3c will be described below with reference to FIG. 6. FIG. 6 is a cross section illustrating an example of a configuration of the saddle stitch binding machine 200-3c according to the present exemplary embodiment.

The saddle stitch binding machine 200-3c includes various units provided for selectively performing various processing, such as stapling processing, cutting processing, punching processing, folding processing, shift discharge processing, or saddle stitch binding processing, on the sheet that has been printed with and sent from the printing apparatus 100, as will be described in detail below.

Furthermore, the saddle stitch binding machine 200-3c does not have a straight path that functions as a sheet conveyance path to a downstream apparatus. Therefore, if a plurality of sheet processing apparatuses is connected to the printing apparatus 100, the saddle stitch binding machine 200-3c is connected as the last apparatus, as illustrated in FIG. 3.

Figure 6:
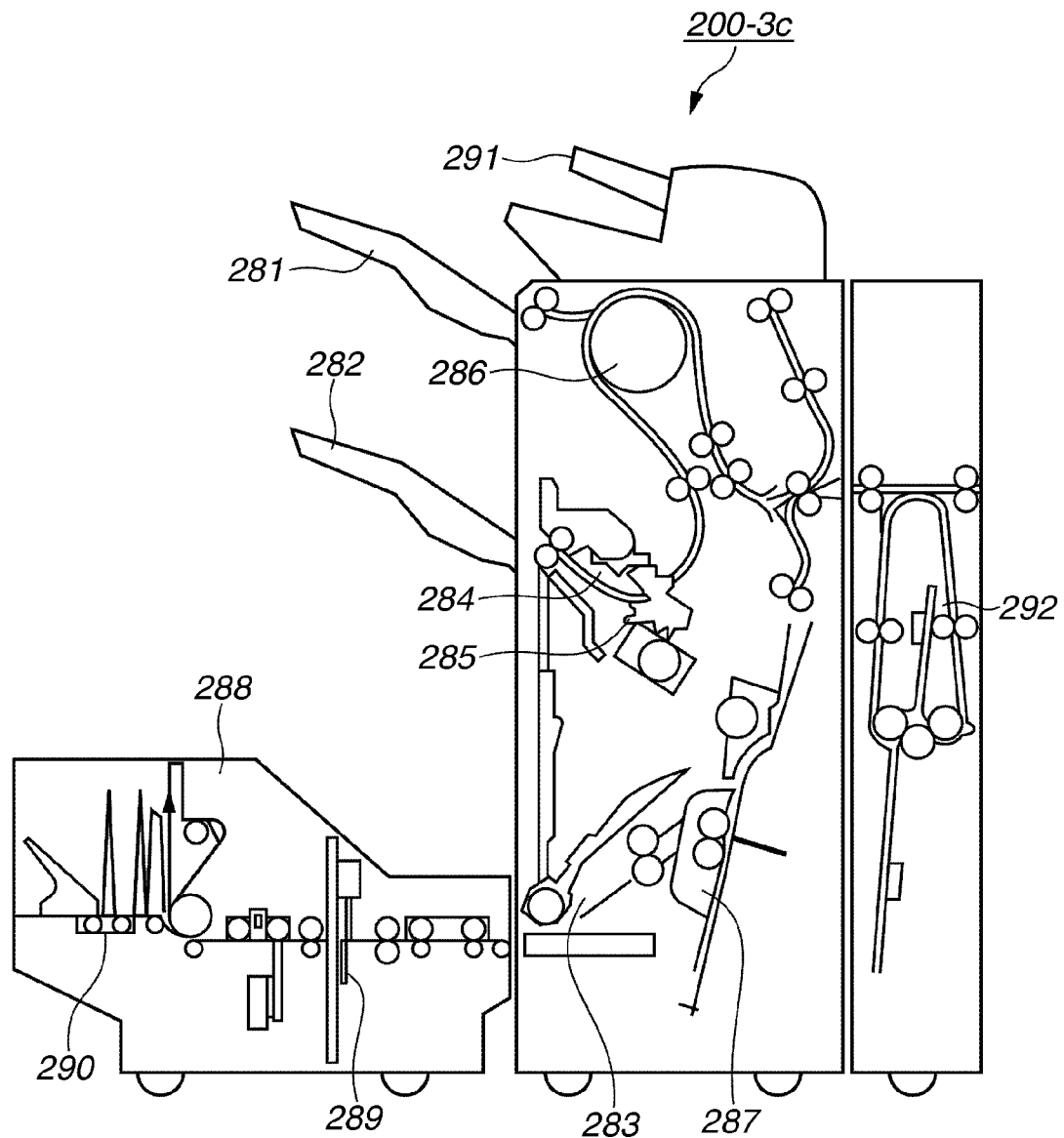
FIG. 6 illustrates an example of an inner configuration of the inline finisher according to an embodiment of the present invention.

In addition, as illustrated in FIG. 6, the saddle stitch binding machine 200-3c has a sample tray 281, a stack tray 282, and a booklet tray 283. The sample tray 281 and the stack tray 282 are provided outside the saddle stitch binding machine 200-3c while the booklet tray 283 is provided inside the saddle stitch binding machine 200-3c.

When the control unit 205 receives an instruction from the operator for performing stapling processing with the saddle stitch binding machine 200-3c, the control unit 205, at first, performs control for serially stacking the sheet that has been printed with the printing apparatus 100 on a processing tray 284, which is provided in the saddle stitch binding machine 200-3c.

After the sheets for one sheet stack are stacked on the processing tray 284, the control unit 205 performs the instructed stapling processing with a stapler 285. Then, the control unit 205 performs control for discharging the stapled sheet stack from the processing tray 284 onto the stack tray 282.

Furthermore, when the control unit 205 receives an instruction from the operator for performing a job for which the Z-folding processing with the saddle stitch binding machine 200-3c has been designated by the operator, the control unit 205 performs processing for folding the sheet that has been printed with the printing apparatus 100 in a Z-like shape with a Z-folding unit 292.

Then, the control unit 205 allows the folded sheet to pass through the saddle stitch binding machine 200-3c and to be discharged onto a discharge tray, such as the stack tray 282 or the sample tray 281.

When the control unit 205 receives an instruction for performing the punching processing with the saddle stitch binding machine 200-3c, the control unit 205 performs control for performing the instructed punching processing on the sheet that has been printed with the printing apparatus 100 with a puncher unit 286.

Then, the control unit 205 allows the sheet to pass through the saddle stitch binding machine 200-3c and to be discharged onto a discharge tray, such as the stack tray 282 or the sample tray 281.

Furthermore, if the control unit 205 performs the job for which the operator has issued an instruction for performing the saddle stitch binding processing with the saddle stitch binding machine 200-3c, the control unit 205, at first, performs saddle stitching at two positions in a central portion of the sheet stack including a plurality of sheets for one set with a saddle stitcher unit 287. After that, the control unit 205 performs two-folding using the central portion of the sheet stack as a reference by engaging the central portion of the sheet stack with a roller.

In the above-described manner, a leaflet-like booklet can be produced. The sheet stack on which the saddle stitch binding processing has been performed with the saddle stitcher unit 287 as described above is then conveyed onto the booklet tray 283.

Furthermore, when the control unit 205 receives an instruction for performing the cutting processing on the job in which saddle stitch binding processing is instructed to be performed, the control unit 205 performs control for conveying the sheet stack that has been saddle-stitch bound from the booklet tray 283 to a trimmer 288.

Subsequently, the control unit 205 performs control for cutting the sheet stack that has been conveyed to the trimmer 288 with a cutter unit 289. Then, the sheet stack that has been cut with the cutter unit 289 is conveyed to a booklet holding portion 290 to be held therein. Here, note that the saddle stitch binding machine 200-3c can perform the three-edge cutting processing on the sheet stack that has been subjected to the saddle stitch binding processing.

It is also to be noted that if the saddle stitch binding machine 200-3c does not include a trimmer, the sheet stack that has been bound with the saddle stitcher unit 287 can be taken out of the booklet tray 283.

Furthermore, the saddle stitch binding machine 200-3c can add the sheet set on an insertion tray 291 (for example, a cover sheet that has been previously printed) to the sheet that has been printed with the printing apparatus 100 and conveyed from the printing apparatus 100.

Now, a configuration of the operation unit 204 according to the present embodiment will be described in detail below with reference to FIG. 7. FIG. 7 illustrates an example of a configuration of the operation unit 204 according to the present exemplary embodiment.

Referring to FIG. 7, the operation unit 204 includes a touch panel unit 401 and a key input unit 402.

The touch panel unit 401 is constituted by a liquid crystal display (LCD) and a transparent electrode attached on the LCD. The touch panel 401 displays various setting screens used for receiving an instruction from the operator.

That is, the touch panel 401 not only functions to display various setting screens but also functions to receive an instruction from the operator. The received instruction is notified to the control unit 205.

The key input unit 402 includes a power key 501, a start key 503, a stop key 502, a reset key 504, a user mode key 505, a numeric keypad 506, and a clear key 507. Here, the start key 503 can be operated by the operator to issue an instruction for starting a copy job or a send job by the printing apparatus 100. The numeric keypad 506 can be operated by the operator to enter a numerical value for a print setting item, such as the number of print copies. The clear key 507 is can be operated by the operator to clear various parameters set with the numeric keypad 506.

The control unit 205 controls the printing system 1000 so that the printing system 1000 performs various processing according to an instruction from the operator received via various screens displayed on the touch panel 401 and an instruction from the operator received via the key input unit 402.

FIG. 8 illustrates an example of a setting screen 800 used for allowing the operator to select a type of the sheet processing to be performed on the sheet that has been printed with the printing apparatus 100 according to the present embodiment.

Referring to FIG. 8, when the operator presses a sheet processing setting key 609 (FIG. 7) on the screen displayed on the touch panel unit 401 (FIG. 7), the control unit 205 displays the setting screen 800 illustrated in FIG. 8 on the touch panel unit 401. The setting screen 800 is configured so that the operator can select a type of sheet processing that can be performed with the sheet processing apparatus 200 in the printing system 1000.

The control unit 205 receives the settings for the sheet processing to be performed during a job to be processed via the setting screen 800 (FIG. 8). Then, the control unit 205 performs the sheet processing with the sheet processing apparatus 200 according to the received settings. The user can input an instruction for executing case binding processing by pressing a "gluing bookbinding 1 (case binding)" key displayed on the setting screen 800.

Figure 9:
FIG. 9 illustrates an example of a screen displayed on the operation unit according to an embodiment of the present invention.

FIG. 9 illustrates an example of a configuration of a setting screen 900 according to the present exemplary embodiment. The operator can register the types, number, and order of sheet processing apparatuses 200 connected to the printing apparatus 100 via the setting screen 900. When the operator presses the operator mode key 505 (FIG. 7), the control unit 205 performs control so that the setting screen 900 can be displayed on the touch panel 401.

For example, in a case where the printing system 1000 has the system configuration illustrated in FIG. 3, the operator sets, via the setting screen 900, registration information indicating that three sheet processing apparatuses 200, namely, the large-capacity stacker 200-3a, the gluing bookbinding machine 200-3b, and the saddle stitch binding machine 200-3c, are connected to the printing apparatus 100 in this order.

In this case, the control unit 205 stores the information related to the sheet processing apparatus 200 set by the operator via the setting screen 900 in the RAM 208 as system configuration information, and reads and refers to the stored information as necessary. Thus, the control unit 205 verifies the type of sheet processing that can be performed by the sheet processing apparatuses 200 and how many sheet processing apparatuses 200 are connected to the printing apparatus 100 in what order.

Suppose that the operator has performed a setting via the setting screen 900 in FIG. 9 so that a saddle stitch binding machine having no straight path is connected at some midpoint of the combination of a plurality of sheet processing apparatuses 200. In this case, the control unit 205 disables the setting and displays an error message on the touch panel 401.

In addition, as illustrated in FIG. 9, it is also useful if the control unit 205 displays guidance information for making a notification for prompting the operator to connect the saddle stitch binding machine 200-3c as the last of the sheet processing apparatuses 200.

In the present embodiment, the operation unit 204 included in the printing apparatus 100 is described as an example of a user interface unit applied in the printing system 1000. However, the configuration is not limited to this. For example, the printing system 1000 can perform the processing according to an instruction generated via the user interface unit included in an external apparatus, such as the PC 103 or the PC 104.

Figure 10:
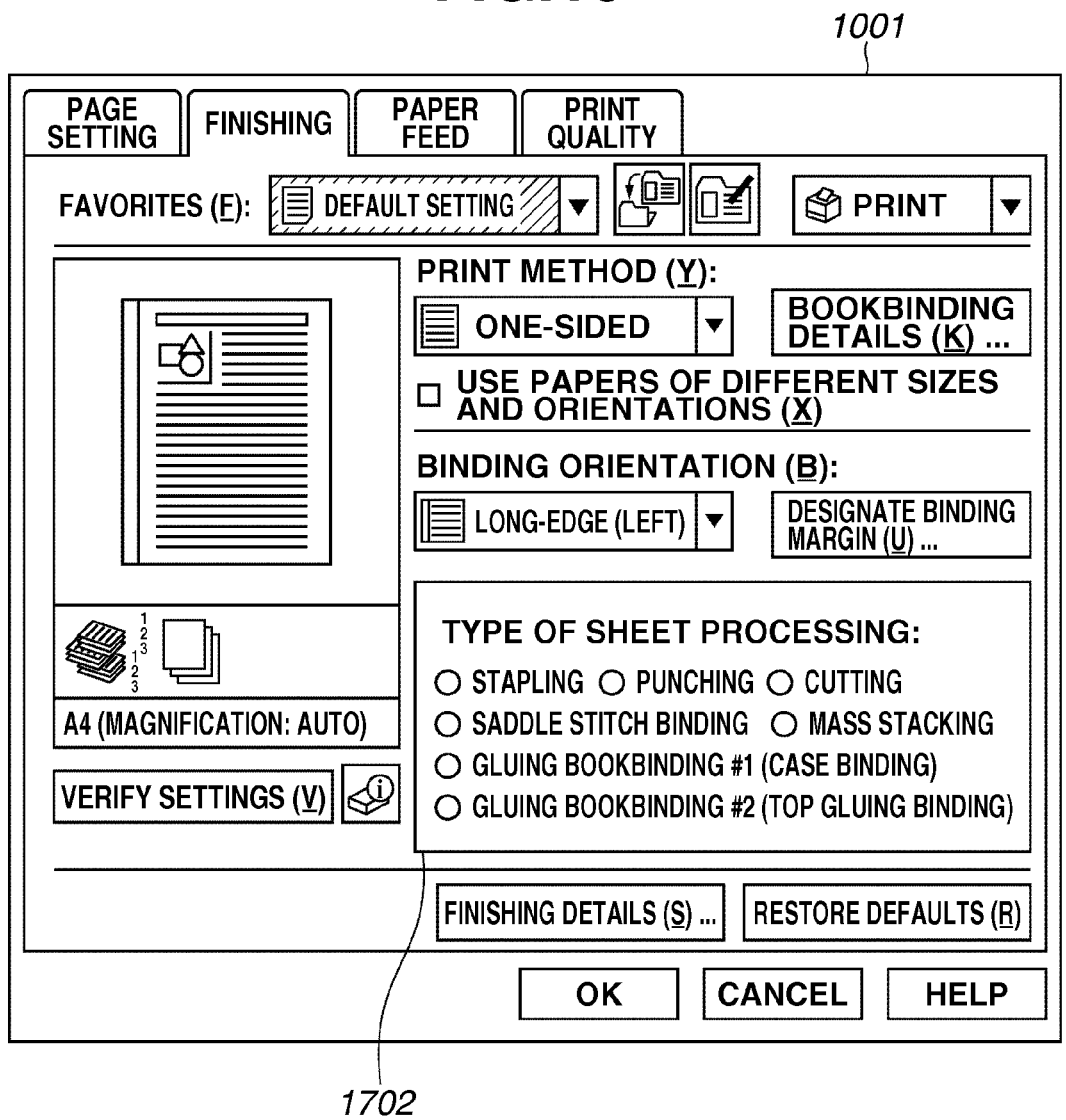
FIG. 10 illustrates an example of a screen displayed on a personal computer (PC) according to an embodiment of the present invention.

In remotely operating the printing system 1000 from an external apparatus, a setting screen 1001 related to the printing system 1000 illustrated in FIG. 10 is displayed on a display unit of the external apparatus. A description thereof will now be made below using the PC 104 as an example.

FIG. 10 illustrates an example of the setting screen 1001 displayed on a display of the PC 104 according to the present embodiment.

Referring to FIG. 10, a CPU included in the PC 104, when receiving a print request from the operator, displays the setting screen 1001 illustrated in FIG. 10 on the display of the PC 104, and then receives the settings set by the operator of the PC 104 via the setting screen 1001 as a print processing condition.

For example, the CPU of the PC 104 receives from the operator the type of the sheet processing to be performed by the sheet processing apparatus 200 with respect to a print job that is requested from the PC 104 via a setting field 1702.

When a request for performing printing is received upon pressing of an OK key in FIG. 10, the CPU of the PC 104 performs control so that the print processing condition input via the setting screen 1001 and the image data to be printed are linked with each other as one job and the job including the print processing condition and the image data is sent to the printing system 1000 via the network 101.

In the printing system 1000, when receiving the print request for printing the job via the external I/F unit 202, the control unit 205 performs control of the printing system 1000 so that the printing system 1000 performs print processing for the job received from the PC 104 according to the print processing condition input by the operator via the PC 104. As described above, various units, as well as the operation unit 204, can be provided in the printing system 1000 as a user interface thereof.

Now, a job holding function used in executing a print job will be described in detail below with reference to FIG. 11. The job holding function is a function for temporarily storing (holding) a print job on a hold queue of the HDD 209 under control by the control unit 205 and for printing a print job if it has been instructed by the user to print the print job via the operation unit 204. The hold queue can hold a print job received from the external PC 103 or a print job for printing an image read with the scanner unit 201. The user can refer to and verify the print job stored on the hold queue by displaying a job holding screen 1101 (FIG. 11) on the operation unit 204.

The job holding screen 1101 is displayed when the user selects a "hold" tab 604 displayed on the touch panel 401 (FIG. 7). More specifically, when the user touches the "hold" tab 604, the control unit 205 controls the touch panel 401 to display the job holding screen 1101. At this time, as illustrated in FIG. 11, the control unit 205 reads information about the print jobs held in an area within the HDD 209 for temporarily storing print jobs (hereinafter simply referred to as a "hold queue") and displays the print job information as a list.

The job holding screen 1101 displays a reception number 1102, a document name 1103, a user name 1104, and a paper type 1105 as information about each print job held on the hold queue.

The operator can select one or more print jobs via the job holding screen 1101. The operator can perform an operation of the corresponding print job by selecting the job via the job holding screen 1101 and touching either one of buttons provided in the lower portion of the job holding screen 1101. The operation includes "preview" 1106, "test-print" 1107, "print" 1108, "delete" 1109, and "edit" 1110.

The "preview" button 1106 can be selected by the operator to display image data included in the corresponding print job as a preview. The "test-print" button 1107 can be selected by the operator to print one copy of the corresponding job. When the "print" button 1108 is selected, it is determined that a print instruction has been input and the corresponding print job is printed. The "delete" button 1109 can be selected by the operator to delete the corresponding print job. The "edit" button 1110 can be selected by the operator to change the setting of the corresponding print job. As described above, the job holding screen can also function as a job selection screen.

By using the hold queue, which temporarily holds the jobs as described above, the user can perform an operation for the job stored on the hold queue without entering a password. Accordingly, an operator other than the user who has input the job can also perform an operation on the job stored on the hold queue.

Furthermore, by using the job holding function, the user can hold a print job for printing a bookbound product (hereinafter also simply referred to as a "bookbinding job") on the hold queue. The bookbinding job includes a job such as a top-gluing binding job, a case binding job, or a saddle stitch binding job. In the present exemplary embodiment, it is supposed that the gluing binding machine 200-3*b* executes case binding processing. A product to be book-bound output by executing case binding processing includes a cover and content. The bookbound product is output by the gluing binding machine 200-3*b* by executing processing for case-binding content sheets with a cover sheet.

In this regard, more specifically, the user generates data for the cover and other data for the content on the PC 103. Then, the user performs a setting for currently displayed page via a print setting screen illustrated in FIG. 12 and instructs printing. When the user print instruction is input, the PC 103 transmits a print job for generating a bookbound print product to the printing apparatus 100.

In this regard, various methods can be used as a method for transmitting the print job for generating a bookbound print product to the printing apparatus 100. For example, in transmitting the print job to the printing apparatus 100, the user can hold the data for the cover and the data for the content on the hold queue of the printing apparatus 100 as one print job.

Furthermore, as another method for transmitting a job to the printing apparatus 100, the user can separately and independently hold a cover print job (hereinafter also simply referred to as a "cover job") and a content print job (hereinafter simply referred to as a "content job") on the hold queue.

Furthermore, if a cover job is already held on the hold queue, the user can transmit only the content job to the printing apparatus 100 to hold the content job in association with the cover job already stored on the hold queue. This method is useful in executing processing for case-binding the content to be instructed to be printed with a cover to be printed by executing the cover job stored on the hold queue. In this case, the user can designate, via a case binding screen 1201 illustrated in FIG. 12, identification information for identifying the cover job held on the hold queue, input a print instruction for printing the job, and transmit the print job to the printing apparatus 100. Then, the printing apparatus 100 mutually associates the content job and the cover job according to the identification information added to the received content job and holds the content job and the cover job on the hold queue.

On the other hand, if a content job has already been held on the hold queue and thus a cover job is transmitted to the printing apparatus 100 in this state, then the user designates identification information for identifying the content job held on the hold queue and instructs printing of the content job. In addition, the printing apparatus 100 mutually associates the cover job and the content job and holds the same on the hold queue according to the identification information added to the received cover job.

Furthermore, if the user desires to perform printing by feeding an already printed cover from the inserter tray 265 by hand, the user can instruct printing of a content job only from the PC 103 and hold the content job on the hold queue.

The user can arbitrarily select a desired method from among the above-described methods as necessary.

Now, a method for inputting a print job for performing case binding from the PC 103 on the hold queue of the printing apparatus 100 will be described in detail below.

Figure 12:
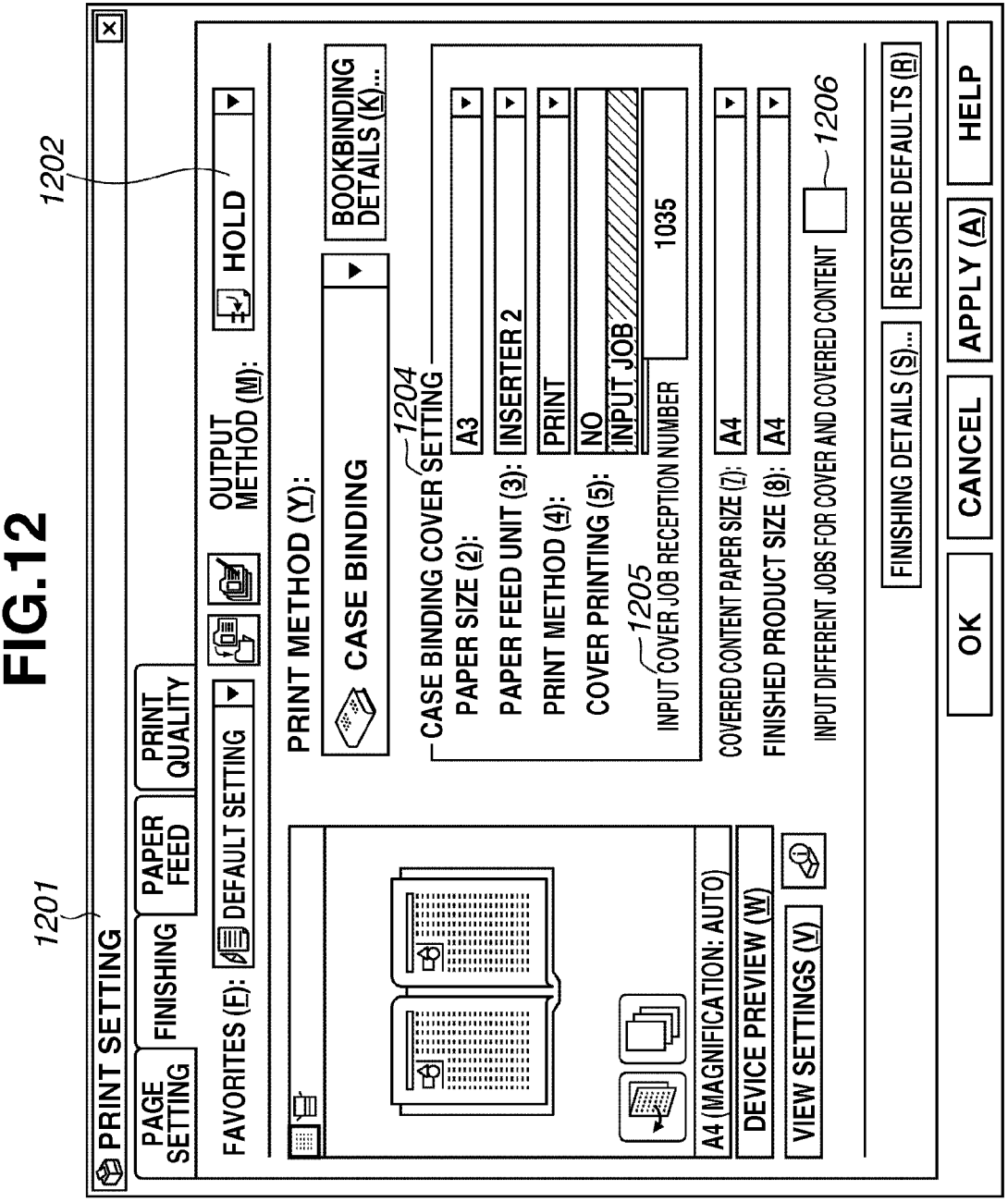
FIG. 12 illustrates an example of display control related to a setting related to a job according to an embodiment of the present invention.

On the PC 103, the user who desires to input a print job generates image data with an application, sets a print setting with the printer driver, and instructs the printing apparatus 100 to perform printing. FIG. 12 illustrates an example of a case binding screen 1201 of a printer driver according to the present exemplary embodiment for performing a setting related to case binding processing.

The case binding screen 1201 is displayed on the operation unit 204 when "case binding" is selected as a setting of a printing method in a "finishing" setting field in the print setting screen 1001 illustrated in FIG. 10. Furthermore, when case binding is selected, a cover setting item 1204 is displayed. By setting a parameter for the setting item 1204, the user can select the paper size of a cover, a paper feed unit for feeding the cover, a printing method for the cover, and whether to print the cover, related to the case binding printing. Furthermore, the user can also select the paper type (not illustrated).

When the user has completely performed the setting of the case binding processing and instructed printing via the case binding screen 1201, the PC 103 transmits the print job, to which the setting set by the user has been added as a print setting of the data to be printed, to the printing apparatus 100.

When the user has selected "printing" in an output method field 1202 in the case binding screen 1201 and instructed printing, the received printing apparatus 100 that has received the print job inputs the received print job in a printing waiting queue. Then, the printing apparatus 100 performs the instructed printing according to the printing order of the print jobs registered in the printing waiting queue.

On the other hand, if the user has instructed case binding via the case binding screen 1201 (FIG. 12), the printing apparatus 100 performs the instructed case binding processing and outputs a case-bound print product. Furthermore, if the user has instructed printing when "hold" is selected in the output method field 1202, the printing apparatus 100, which has received the print job, determines that the print job is a job to be held on the hold queue and then inputs the received print job on the hold queue.

Now, a method for instructing printing from the PC 103 related to the case binding processing will be described in detail below.

The method for instructing printing related to case binding includes the following four case binding cover/content instruction methods (1) through (4).

<Case Binding Cover/Content Instruction Method (1)>

When the "case binding cover/content instruction method (1)" is selected, the user can hold the content job to be printed and the cover job held on the hold queue in association with each other. The "case binding cover/content instruction method (1)" is useful if the processing for printing a cover has already been stored on the printing apparatus 100.

More specifically, if it is determined by the PC 103 that the user has selected an "input job" as the printing method for the cover in the setting item 1204, then an area of the screen for receiving an input of a reception number 1205 of the input cover job is displayed. At this time, the user can enter a reception number of the job that has already been input on the hold queue of the printing apparatus 100.

Subsequently, if it is detected by the PC 103 that the user has pressed an OK key via the print setting screen 1001, then the PC 103 transmits a print job including print data for the content and a print condition set via the case binding screen 1201 to the printing apparatus 100 as PDL data. After receiving the print job, the printing apparatus 100 holds the received print job on the hold queue as a content job.

<Case Binding Cover/Content Instruction Method (2)>

When the "case binding cover/content instruction method (2)" is selected, the cover job and the content job can be held on the printing apparatus 100 as one print job. The "case binding cover/content instruction method (2)" is useful if the content job and the cover job are yet to be printed.

More specifically, in holding the data for the cover and the data for the content on the printing apparatus 100 as one job, the user selects "print" as the print method. Subsequently, if it is determined that the user has pressed the OK key via the print setting screen 1001, the PC 103 transmits the print job including the data of the content, the data for the cover, and the print condition set via the case binding screen 1201 to the printing apparatus 100 as PDL data. After receiving the print job, the printing apparatus 100 holds the received print job on the hold queue as one print job for printing the content and the cover.

<Case Binding Cover/Content Instruction Method (3)>

When the "case binding cover/content instruction method (3)" is selected, the cover job and the content job are held as mutually different print jobs. The "case binding cover/content instruction method (3)" is useful when the content job and the cover job are yet to be printed.

More specifically, in holding the cover job and the content job as different two print jobs, the user selects "print" as the print method and marks a check box of a cover/content separate setting field 1206. Subsequently, if it is determined that the user has pressed the OK key via the print setting screen 1001, then the PC 103 transmits the print job including the data for the cover, the data for the content, and the print condition set via the case binding screen 1201 to the printing apparatus 100 as PDL data. After receiving the print job, the printing apparatus 100 holds the received print job on the hold queue separately as the content job and the cover job.

<Case Binding Cover/Content Instruction Method (4)>

When the "case binding cover/content instruction method (4)" is selected, a sheet placed on the inserter tray 265 (FIG. 5) is used as sheet for the cover. The "case binding cover/content instruction method (4)" is useful when an already output sheet is used as the cover.

More specifically, in this case, the user selects "no" (do not print) as the print method. Subsequently, if it is determined that the user has pressed the OK key via the print setting screen 1001, then the PC 103 transmits the print job including the data for the content and the print condition set via the case binding screen 1201 to the printing apparatus 100 as PDL data. After receiving the print job, the printing apparatus 100 holds the received print job on the hold queue as the content job.

Now, the operation of the control unit 205 of the printing apparatus 100 performed after receiving the print job transmitted by the above-described method will be described in detail below. After receiving the print job from the PC 103, the control unit 205 analyses the PDL data and determines whether the received print job has been instructed to be held on the hold queue. If the received print job has been instructed to be held on the hold queue, then the control unit 205 issues a reception number of the print job and stores the same on the hold queue.

Furthermore, the control unit 205 determines whether the received print job has been instructed to be case-bound. If the received print job has been instructed to be case-bound, then the control unit 205 performs the following control. That is, the control unit 205 determines which of the above-described case binding cover/content instruction methods (1) through (4) has been designated by the user according to the print condition set for the print job. The control unit 205 changes the method for holding the print job on the hold queue according to the designated case binding cover/content instruction method.

If it is determined that the case binding cover/content instruction method (1) or (4) has been designated, the control unit 205 holds the received print job on the hold queue as a content job.

On the other hand, if it is determined that the case binding cover/content instruction method (2) has been designated, then the control unit 205 holds the received print job on the hold queue as one job for printing the content and the cover.

On the other hand, if it is determined that the case binding cover/content instruction method (3) has been designated, then the control unit 205 holds the job on the hold queue separately as a cover job and a content job.

Furthermore, the control unit 205 adds the data of the print job to the hold queue and records attribute information indicating which of the case binding cover/content instruction methods (1) through (4) has been designated with respect to each print job in a job management table 1301 (FIG. 13).

The job management table 1301 manages information such as the reception number 1102, the document name 1103, the user name 1104, and the paper type 1105, which are displayed on the job holding screen 1101, with respect to each job. In addition, the job management table 1301 manages information such as the case binding cover/content instruction method and the reception number of the cover job with respect to each print job.

After receiving the print job from the PC 103, the control unit 205 analyzes the PDL data included in the received print job. If it is determined that the print job has been instructed to be held on the hold queue, then the control unit 205 performs the following control. That is, the control unit 205 stores the print job on the HDD 209 and stores the information 1102 through 1105 in the job management table 1301 as information about the stored print job.

Note that if it is determined that the case binding cover/content instruction method (1) or (3) has been designated, then the control unit 205 sets the reception number of the cover job in the job management table 1301 as the print job information. More specifically, if the method (1) has been designated, the control unit 205 registers the reception number entered by the user via the case binding screen 1201 in the job management table 1301. On the other hand, if the method (3) has been designated, the reception number allocated by the control unit 205 to the cover job in separately holding the content job and the cover job is set in the job management table 1301.

The control unit 205 displays the job holding screen 1101 (FIG. 11) on the operation unit 204 according to the information stored in the job management table 1301. In this case, the control unit 205 identifies the correspondence relationship between the content job and the cover job and displays the identified correspondence relationship between the content job and the cover job on the job holding screen 1101 displayed on the operation unit 204 to allow the user to easily recognize the same.

In displaying the job holding screen 1101 on the operation unit 204, the control unit 205 performs the following control. That is, the control unit 205 identifies the cover job corresponding to the content job having the reception number 003 as the cover job having the reception number 002, for example. Then, the control unit 205 displays the same number in a related job field 1011 for the reception numbers 002 and 003.

Thus the user can easily recognize the correspondence relationship between the cover job and the content job even if a plurality of cover jobs and a plurality of content jobs are held on the hold queue.

Note that the method for specifically displaying the correspondence relationship between the cover job and the content job is not limited to the above-described method for displaying the same number in the related job field 1011. That is, it is also useful if the same symbols are displayed. Furthermore, it is also useful if the corresponding jobs are displayed in the same color.

Furthermore, it is also useful if the control unit 205, if the user has selected the content job, changes the color of the field for the content job and the color of the field for the cover job corresponding to the content job. Thus, the user can easily identify and recognize the cover job corresponding to the content job in printing the content job.

As described above, the printing apparatus 100 having the above-described configuration can allow the user to easily recognize the correspondence relationship between the content job and the cover job held on the hold queue.

In the present exemplary embodiment, the information about the cover job corresponding to the content job is managed as information about the content job. However, it is also useful if the information about the content job corresponding to the cover job is managed as the information about the cover job.

In the first exemplary embodiment, the printing apparatus 100 holds the mutually associated cover job and content job and prints the print job instructed by the user to be printed.

By using the printing apparatus 100 having the above-described configuration, the user can select and instruct printing of the content job only. If the content job only is selected and instructed to be printed, then the control unit 205 performs the content job and stacks sheets for the content on the gluing binding machine 200-3b. In addition, after completely stacking sheets for one book, the control unit 205 feeds a cover sheet for case-binding the sheets stacked in the gluing binding machine 200-3b. In this case, if the cover has already been printed, the user sets the cover on the inserter tray 265 and can print the cover with the printing apparatus 100.

However, if the user has not instructed printing of the cover job, the printing by the printing apparatus 100 may be stopped due to a failure "no paper". In this regard, the content job may be output instead of stopping the printing. However, the sheets having the content are output without being case-bound by the cover. Thus, in this case, the user may obtain an undesired output product.

In order to address this, a second exemplary embodiment of the present invention prevents outputting a product not desired by the user, which may be output when the user has instructed printing of the content job held on the hold queue only and thus the content job only is output.

Figure 14:
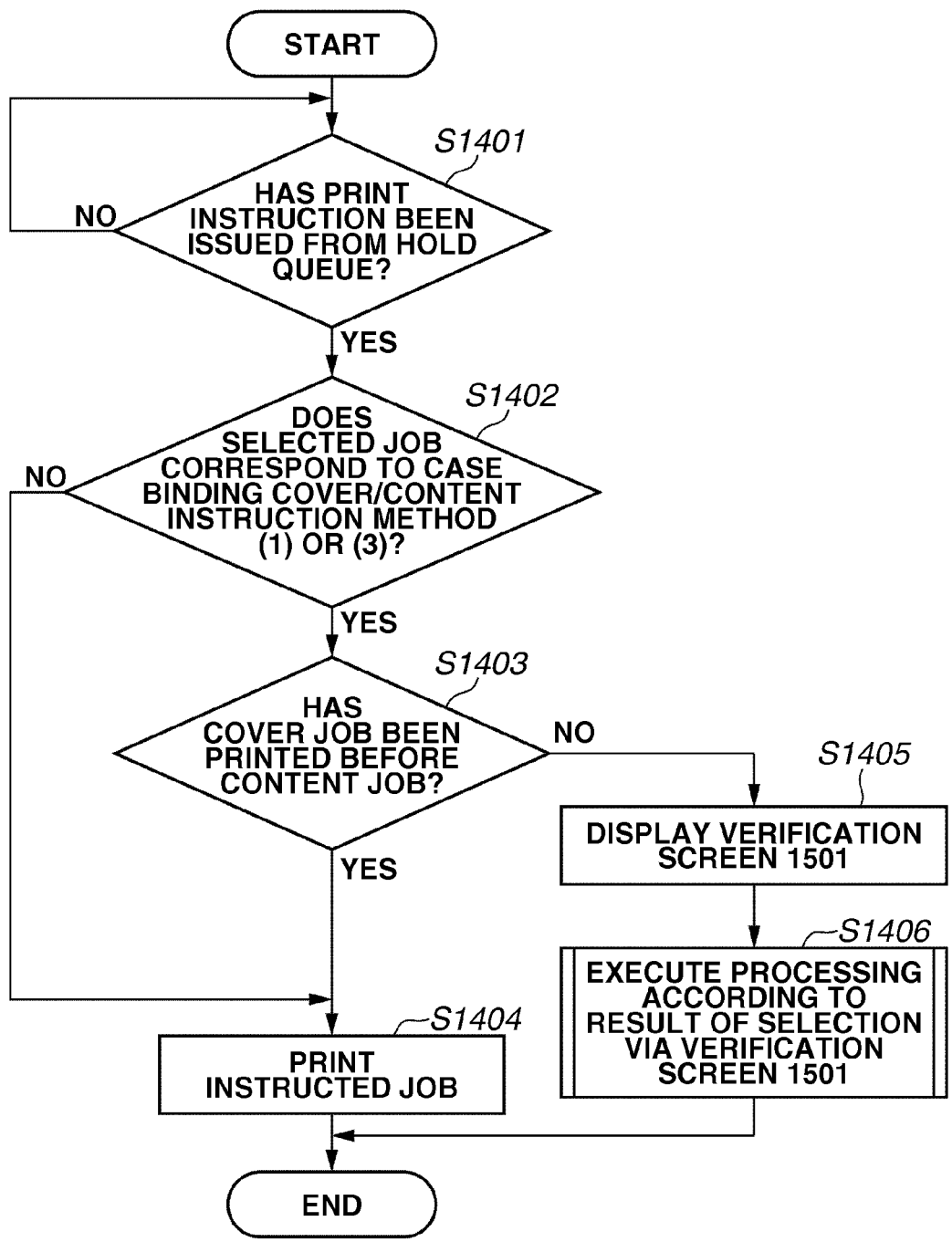
FIG. 14 is a flow chart illustrating exemplary processing for controlling a method for processing a job according to an embodiment of the present invention.
Figure 15:
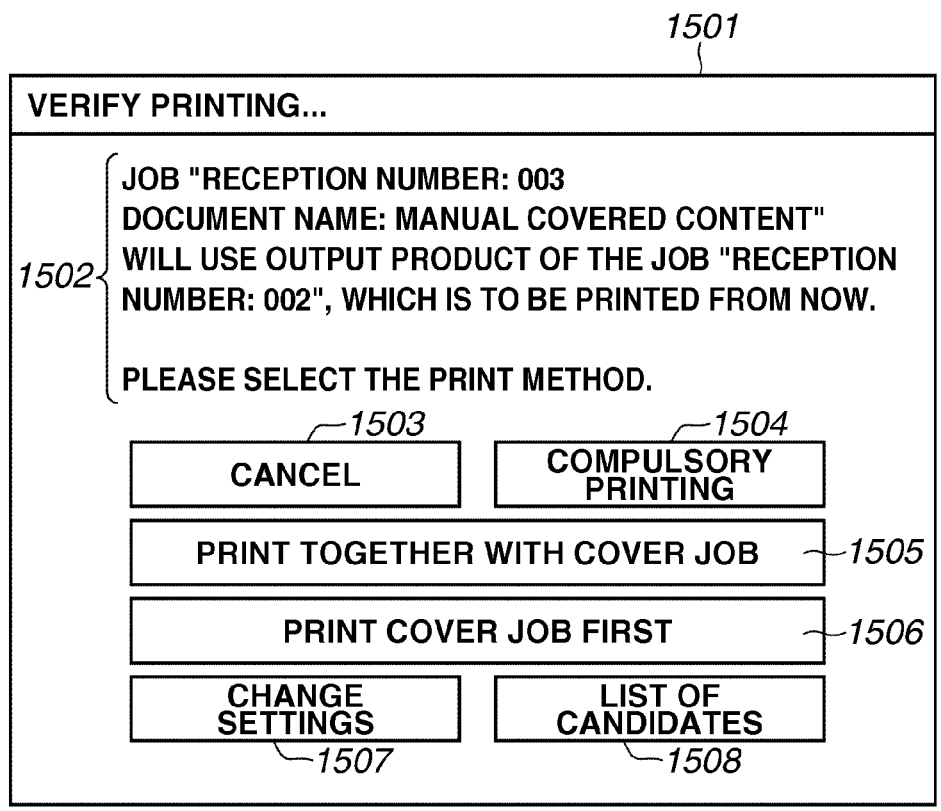
FIG. 15 illustrates an example of display control related to changing the method for processing a job according to an exemplary embodiment of the present invention.

FIG. 14 is a flow chart illustrating an exemplary operation for performing print processing according to the present exemplary embodiment. Each processing in the flow chart of FIG. 14 is executed with the control unit 205 by reading and executing a program previously stored on the ROM 207.

Referring to FIG. 14, in step S1401, the control unit 205 determines whether the user has input an instruction for printing from the hold queue. More specifically, the control unit 205 determines whether the user has selected a job via the job holding screen 1101 and pressed the print key 1108 (i.e., whether the user has input a print instruction). If the user has selected a print job via the job holding screen 1101 and it is detected that the print key 1108 has been pressed (YES in step S1401), then the control unit 205 determines that the instruction for printing from the hold queue has been input.

In step S1402, the control unit 205 refers to the information stored in the job management table 1301 to determine whether the case binding cover/content instruction method (1) or (3) has been designated for the print job selected in step S1401.

If the method other than the case binding cover/content instruction methods (1) and (3) has been designated for the selected print job (NO in step S1402), then the processing advances to step S1404. In step S1404, the control unit 205 transfers the instructed print job as it is to the printing waiting queue. In addition, the control unit 205 prints the print job with the printer unit 203 according to the printing order. On the other hand, if the case binding cover/content instruction methods (1) or (3) have been designated for the selected print job (YES in step S1402), then the processing advances to step S1403. In step S1403, since the print job is a content job, the control unit 205 determines whether the cover job has already been printed. If the cover job has already been printed (YES in step S1403), the user can set the already printed cover on the inserter tray 265 and print the cover job and the content job. Here, the control unit 205 refers to the reception number of the cover job stored in the job management table 1301 of the selected print job to perform the determination in step S1403.

More specifically, the control unit 205 determines whether the print job having the reception number of the selected print job has been or is to be output before printing the selected print job. In this regard, for example, the control unit 205 refers to the printed job history to determine whether the print job having the reception number of the selected print job has already been printed.

Furthermore, the control unit 205 refers to an execution waiting job queue to determine whether the print job having the reception number of the selected print job is to be output before the selected print job. Alternatively, the control unit 205 verifies whether the print job whose printing has already started includes the print job having the corresponding reception number. Here, the state in which "printing has already started" is not limited to a state where image forming with the printer unit 203 has been started. That is, the state in which "printing has already started" can include a state in which the printing of another print job has already been started and the print job is to be started after the another print job is completely printed.

If the cover job has already been or is to be printed before printing the selected print job (YES in step S1403), then the processing advances to step S1404. In step S1404, the control unit 205 prints the selected print job as it is. On the other hand, if the cover job has not been printed yet in step S1403 (NO in step S1403), then the processing advances to step S1405. In step S1405, the control unit 205 displays a verification screen 1501 (FIG. 15) for allowing the user to select how the selected print job is to be processed on the operation unit 204. The control unit 205 performs control in step S1406 according to the instruction input from the user via the verification screen 1501.

Now, what is displayed by the verification screen 1501 will be described in detail below. The verification screen 1501 displays a message 1502 indicating the cause for displaying the verification screen. In the present exemplary embodiment, the message 1502 indicates that the cover for the case binding processing has not been printed yet and thus the content only is to be output if the job is printed with the current setting. The verification screen 1501 displays various soft keys, which can be selected by the user. The soft keys include a "cancel" key 1503, a "compulsory printing" key 1504, a "print together with cover job" key 1505, a "print cover job first" key 1506, a "change settings" key 1507, and a "list of candidates" key 1508. The user can select a desired processing method by pressing a soft key corresponding to the desired processing method.

Now, "post verification processing", which is performed in step S1406, will be described in detail below. In step S1406, the control unit 205 performs printing according to the processing method selected by the user. Hereinbelow, the processing performed according to each processing method will be described in detail.

When the "cancel" key 1503 has been pressed, the control unit 205 closes the verification screen 1501 and stops the printing of the print job selected in step S1401.

When the "compulsory printing" key 1504 has been pressed, the control unit 205 closes the verification screen 1501, transfers the print job selected in step S1401 to the execution waiting queue, and starts printing according to the printing order.

When the "print together with cover job" key 1505 has been pressed, the control unit 205 closes the verification screen 1501 and combines the cover job and the content job selected in step S1401 into one job. More specifically, the control unit 205 combines the content job selected in step S1401 and the cover job corresponding to the content job into one job according to the information stored in the job management table 1301.

In addition, the control unit 205 prints the content with the printer unit 203 and stacks the printed sheet on the stacking unit 266 of the gluing binding machine 200-3b, as in the case binding processing. Furthermore, the control unit 205 prints the cover with the printer unit 203, case-binds the content glued through the cover path 261 of the gluing binding machine 200-3b with the cover, and outputs the case-bound printed sheet bundle. By combining and printing the content job and the cover job as described above, the present exemplary embodiment can case-bind the content sheets with the cover sheet and output the case-bound print product without causing the user to set the cover sheet printed by executing a cover job on the inserter tray 265.

When "print cover job first" key 1506 has been pressed, the control unit 205 closes the verification screen 1501 and starts the printing of the cover job held on the hold queue. More specifically, the control unit 205 executes the cover job identified by the "cover job reception number" of the print job selected in step S1401 according to the information stored in the job management table 1301. Then, the control unit 205 starts the printing of the content job selected in step S1401 after executing the cover job. In this case, in outputting the case-bound printed sheet bundle, the user sets the cover that has been printed first on the inserter tray 265 of the gluing binding machine 200-3b. The control unit 205 prints the content with the printer unit 203 and stacks the printed content sheet(s) on the stacking unit 266 of the gluing binding machine 200-3b. Then, the control unit 205 feeds the cover from the inserter tray 265, case-binds the contentblock that has been glued through the cover path 261 of the gluing binding machine 200-3b with the cover sheet, and outputs the case-bound printed sheet bundle.

Figure 16:
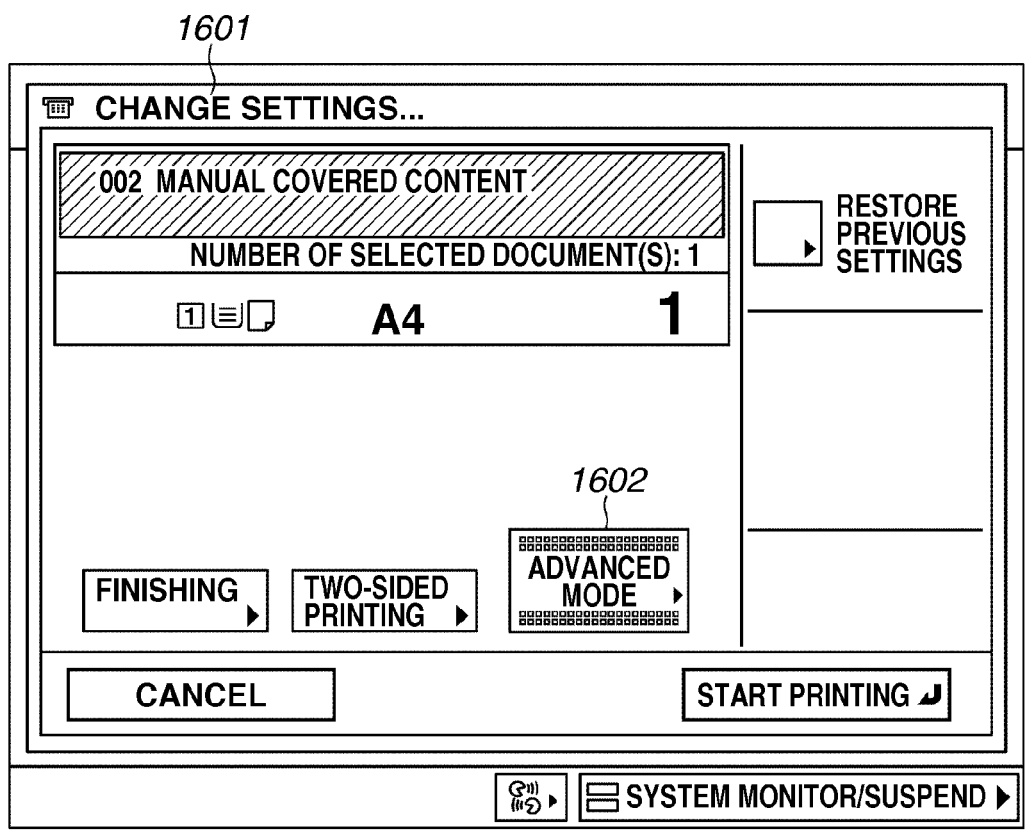
FIG. 16 illustrates an example of display control of a user interface (UI) screen related to changing a setting of a job according to an embodiment of the present invention.
Figure 17:
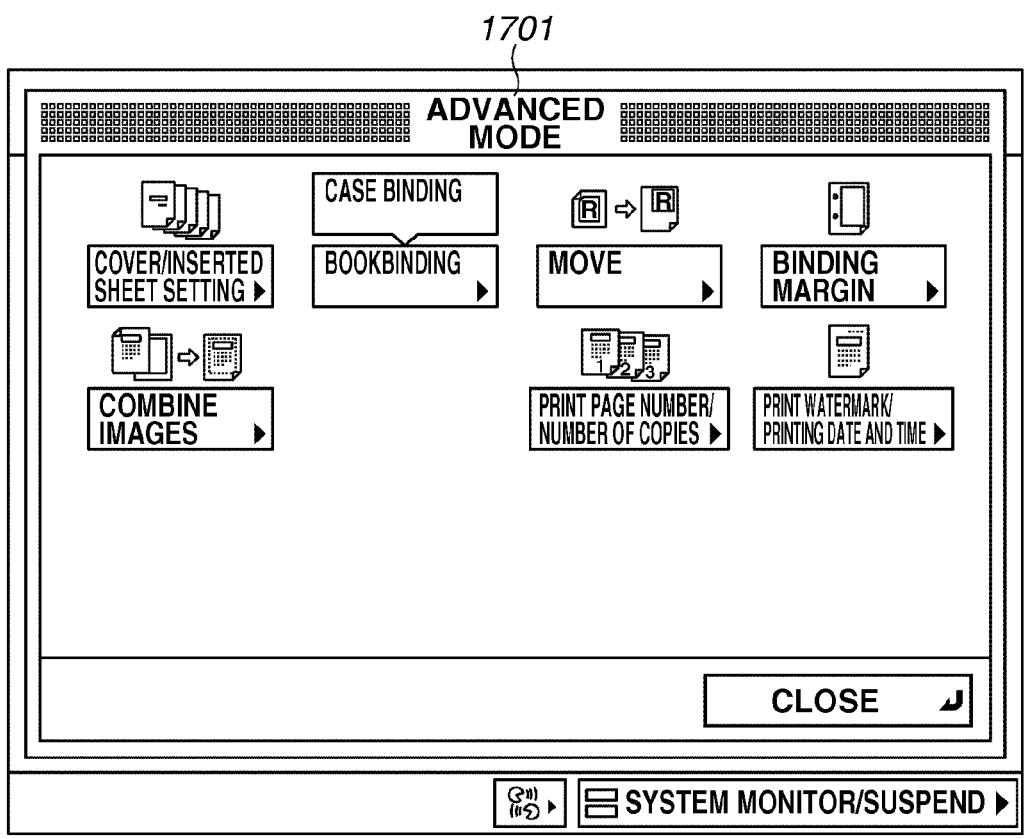
FIG. 17 illustrates an example of display control instructed via a UI screen related to changing a setting of a job according to an embodiment of the present invention.

When the "change settings" key 1507 has been pressed, the control unit 205 displays a setting changing screen 1601 illustrated in FIG. 16. The setting changing screen 1601 displays an advanced mode key 1602. If the advanced mode key 1602 has been pressed by the user, the control unit 205 displays an advanced mode screen 1701 illustrated in FIG. 17 on the touch panel 401. The user can cancel or disable the setting for the case binding processing. The control unit 205 starts the printing of the print job selected in step S1401 according to the setting updated with the change input by the user via the setting changing screen 1601 and the advanced mode screen 1701.

Figure 18:
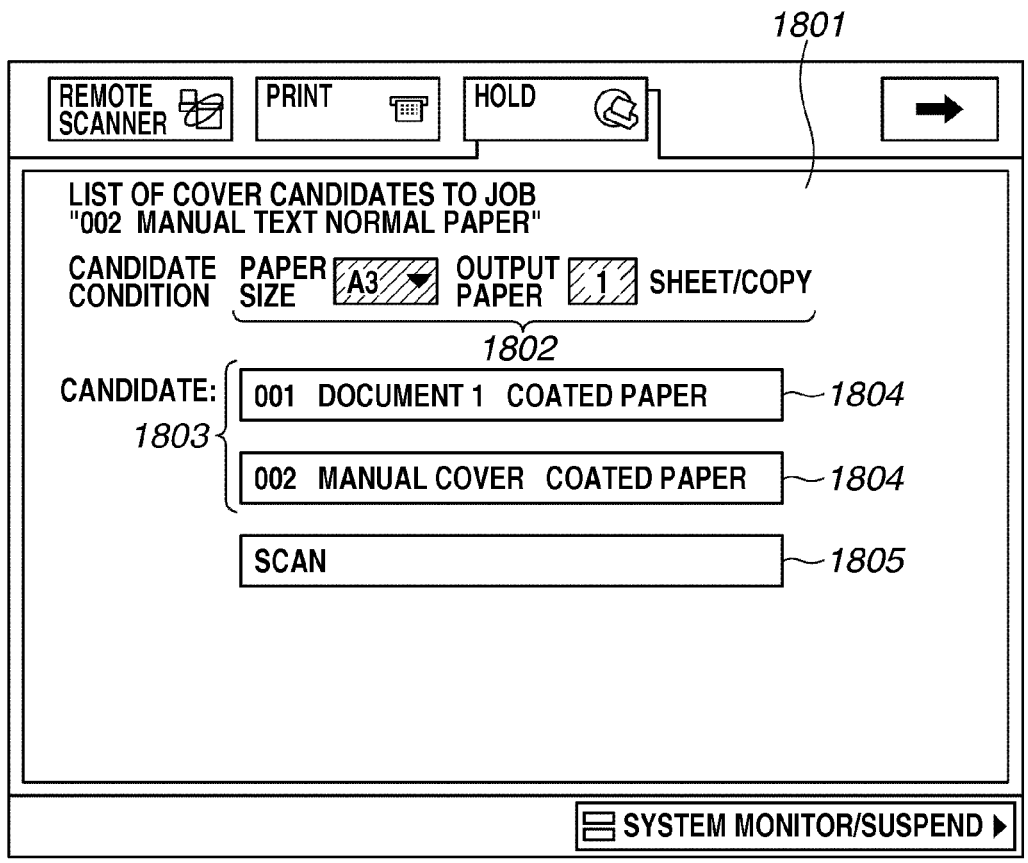
FIG. 18 illustrates an example of display control related to a method for selecting a related job according to an embodiment of the present invention.

When the "list of candidates" key 1508 has been pressed, the control unit 205 displays a candidate list screen 1801 illustrated in FIG. 18. By pressing the "list of candidates" key 1508, the user can select the cover job corresponding to the content job selected in step S1401 and output the selected job as the cover job.

The candidate list screen 1801 displays a list of jobs whose paper size complies with the paper size set for the content job selected in step S1401, which have been extracted by the control unit 205 from among jobs held or stored on the hold queue and boxes. A "box" is a storage area provided within the HDD 209 and different from the hold queue. Here, the hold queue and the box can be provided on different memory devices.

The control unit 205 can receive a condition (the paper size, the paper type, and the like) for searching for a cover job input from the user via the candidate list screen 1801. The control unit 205 can search for candidate jobs according to the received search condition. If it is detected that the setting for a search condition 1802 has been changed, the control unit 205 searches for jobs held or stored on the hold queue and the box according to the condition set in the search condition field 1802. Then, the control unit 205 displays a candidate job key 1804 in a candidate job field 1803, which indicates the name of the candidate job.

Furthermore, if it is detected that the candidate job key 1804 has been selected, the control unit 205 prints the job selected via the candidate job key 1804. Then, the control unit 205 prints the content with the printer unit 203 and stacks the printed content sheets on the stacking unit 266 of the gluing binding machine 200-3b, as in the case where the user has pressed the "print cover job first" key 1506. Then, the control unit 205 feeds the cover selected via the candidate job key 1804 and that has been printed from the inserter tray 265, case-binds the contentblock glued through the cover path 261 of the gluing binding machine 200-3b with the cover, and outputs the case-bound printed sheet bundle.

When a "scan" key 1805 has been pressed, the control unit 205 reads a document with the scanner unit 201, feeds a sheet complying with the search condition 1802, and prints an image of the read document with the printer unit 203. Furthermore, the control unit 205 prints the content with the printer unit 203 and stacks the printed content sheets on the stacking unit 266 of the gluing binding machine 200-3b. Then, the control unit 205 feeds the cover sheet having the image of the document read with the scanner unit 201 from the inserter tray 265, case-binds the contentblock glued through the cover path 261 of the gluing binding machine 200-3b with the cover, and outputs the case-bound printed sheet bundle.

As described above, the printing apparatus according to the present exemplary embodiment can prevent outputting a product of the content only, which is not desired by the user, when the user instructs printing of the content job held on the hold queue.

In the second exemplary embodiment, the control unit 205 determines whether the cover job is to be printed before printing the content job in step S1403 and performs the subsequent processing according to a result of the determination. In a third exemplary embodiment, the control unit 205 performs the following control in step S1403. That is, if the user has instructed printing of a content job only, the control unit 205 determines whether a cover job corresponding to the content job can be printed according to whether the cover job has been held on the hold queue. In addition, if it is determined that the cover job has been held on the hold queue and thus can be printed, then the control unit 205 controls so that the content job and the cover job are output at the same time.

On the other hand, if the cover job has not been held on the hold queue and thus cannot be printed, then the control unit 205 notifies so to the user. Furthermore, the control unit 205 performs control for displaying a screen for performing a setting for supplying a cover from a unit other than the hold queue on the operation unit 204. In this regard, the control unit 205 displays, on the operation unit 204, a screen for allowing the user to select between feeding the cover from the inserter tray 265 and feeding the cover by executing the cover job stored in the box.

By performing the above-described control, the present exemplary embodiment can allow the user to print the content job and the cover job at the same time if the user has instructed printing of the content job and if the cover job has been held on the hold queue. Furthermore, if the user has instructed printing of the content job, the printing apparatus 100 can allow the user to select the method of feeding the cover if the cover job has not been held on the hold queue. Thus, the present exemplary embodiment can perform the control as desired by the user. Note here that it is also useful if the control unit 205, if the user has instructed printing of the cover job only, determines whether the content job corresponding to the cover job can be printed and outputs the content job and the cover job at the same time if it is determined that the content job can be printed.

Now, a fourth exemplary embodiment of the present invention will be described in detail below with reference to FIG. 19. In the present exemplary embodiment, if the user has selected the content job only and if the selected content job has been associated with the cover job, then the printing apparatus 100 automatically prints the content job and the cover job without requiring the user to verify the processing.

The control according to the present exemplary embodiment will be described in detail below. Note here that in the present exemplary embodiment, the printing system 1000 has the configuration illustrated in FIG. 3 as in the first and the second exemplary embodiments. In addition, the method for inputting a case binding job into the hold queue of the printing apparatus 100 the method for instructing the cover and the content during the case binding processing are the same as those in the first and the second exemplary embodiments.

Figure 19:
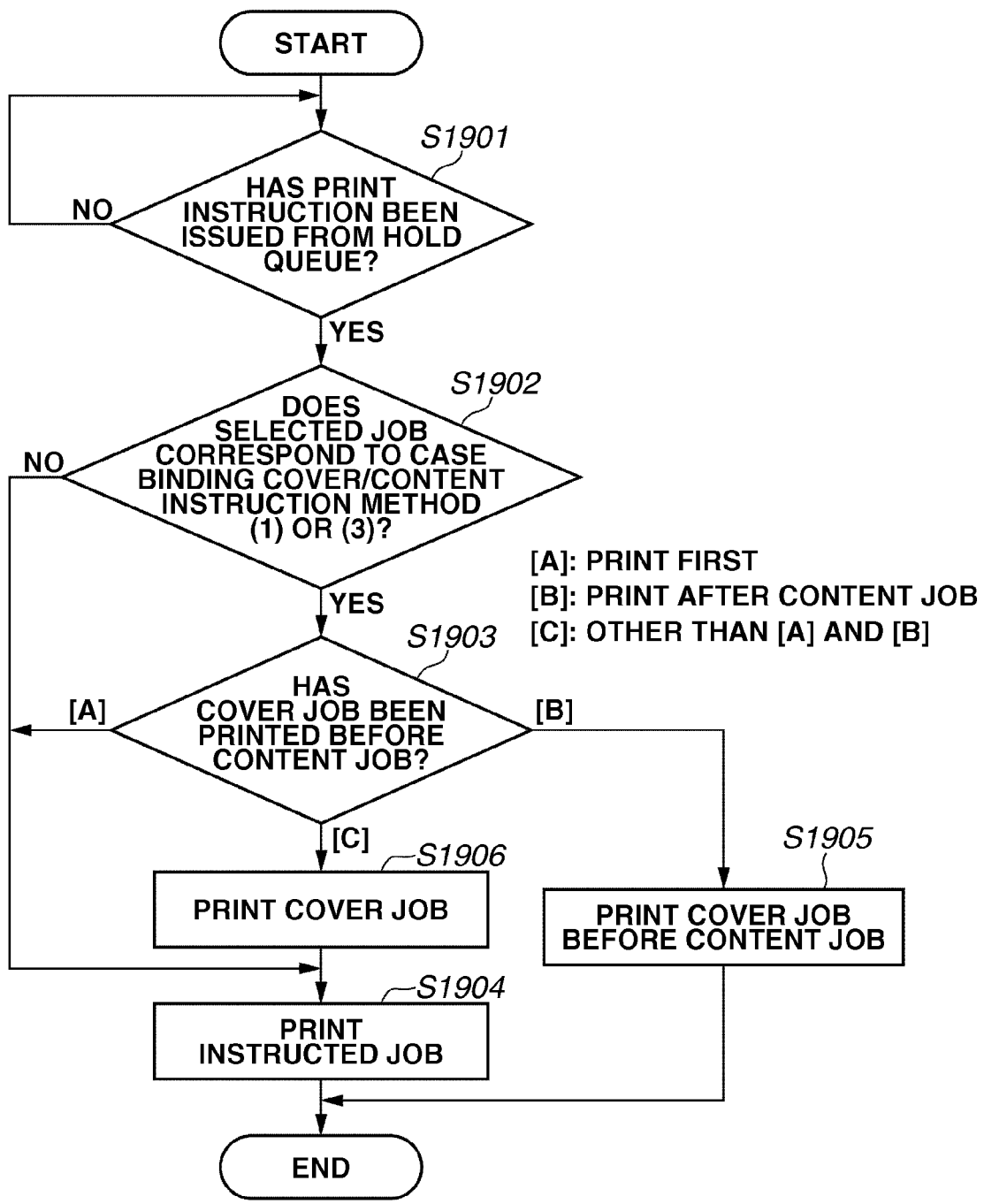
FIG. 19 illustrates an exemplary flow of control for changing the printing order of a job according to an embodiment of the present invention.

FIG. 19 is a flow chart illustrating exemplary print processing according to the present exemplary embodiment. Note that in the present exemplary embodiment, processing different from that described above with reference to FIG. 14 only will be described in detail below. That is, processing in steps S1901 through S1903 is the same as that in steps S1401 through S1403, and accordingly, the description thereof will not be repeated here. The following processing is centrally controlled by the control unit 205.

Referring to FIG. 19, in step S1903, the control unit 205 determines the current status of the cover job. More specifically, at first, the control unit 205 acquires the reception number of the cover job stored in the job management table 1301 of the selected print job. Then, the control unit 205 determines in which of the following states the cover job is. The states include a state A, in which the cover job having the acquired reception number has already been printed or is to be printed before printing the selected content job, a state B, in which the cover job is to be printed after printing the content job, and a state C, which is a state other than the states A and B. In the state C, the content job and the cover job have been combined, for example.

If the cover job is in the state A, the control unit 205, in step S1904, prints the selected content job as it is. On the other hand, if the cover job is in the state B, the control unit 205, in step S1905, changes the printing order of the cover job so that the cover job is to be printed before printing the content job. More specifically, in this case, the control unit 205 does not start printing the content job until the cover job is printed (starts printing the content job after printing the cover job). As described above, if the cover is output before the content, it is useful, in printing the content job, not to start printing the content job until the cover sheet is set on the inserter tray 265 and to start printing the content job after the cover is set on the inserter tray 265. By performing the above-described control, the present exemplary embodiment can output a case-bound print product by feeding the cover set on the inserter tray in executing the content job.

If it is determined that the cover job is in the state C in step S1903, then the processing advances to steps S1906 and S1904. In steps S1906 and S1904, the control unit 205 prints the content with the printer unit 203 and stacks the printed content sheet on the stacking unit 266 of the gluing binding machine 200-3b. In addition, the control unit 205 prints the cover with the printer unit 203, case-binds the contentblockc glued through the cover path 261 of the gluing binding machine 200-3b, and outputs the case-bound print product bundled in this manner. By printing the combined content job and the cover job, the present exemplary embodiment can case-bind the contentblock with the cover and output the case-bound print product without requiring the user to set the sheet printed by executing a cover job on the inserter tray 265.

As described above, the printing apparatus according to the present exemplary embodiment performs the control for automatically outputting the cover job before outputting the content job even when the user has issued an instruction for printing the content job only before printing the cover job. Furthermore, in printing the content job, if the cover has been output before the content job, the present exemplary embodiment does not start printing the content job until the printed cover is set on the inserter tray 265 and prints the content job after the cover is set on the inserter tray 265.

In this regard, it is also useful if a message to prompt the user to set the cover on the inserter tray 265 is displayed on the operation unit 204 while suspending the content job. Furthermore, if a print job subsequent to the content job that has been suspended exists in the execution waiting queue while the printing of the content job is suspended, it is also useful to execute the subsequent print job in priority to the suspended content job. In addition, it is also useful if one print job including a content job and a cover job combined with each other is executed instead of printing the cover job before the content job. With the above-described configuration, if the user has selected and instructed the printing of the content job only, the present exemplary embodiment can automatically output the content job together with the cover job by using the printing apparatus 100.

With the above-described configuration, the present exemplary embodiment is useful if the user who has input the print job (job inputting user) is different from the user who selects and executes the print job on the printing apparatus 100 (execution instructing user), for example. In this case, the printing apparatus 100 holds the print job input by the job inputting user on the hold queue and executes the print job if the execution instructing user has instructed printing of the print job.

By using the job holding function, the job inputting user can input a print job on the printing apparatus 100 without particularly becoming aware of the order of outputting print jobs. In addition, the execution instructing user can issue print instructions in an efficient printing order by referring to the status of the printing apparatus 100 and the list of jobs held on the hold queue. However, if the job inputting user separately inputs a content job and a cover job, the execution instructing user may not recognize the correspondence relationship between the input content job and cover job. In this regard, according to the present exemplary embodiment, the correspondence relationship between the content job and the cover job is displayed in a user-recognizable manner. Thus, the user (execution instructing user) can easily identify and recognize the correspondence relationship between the content job and the cover job.

Furthermore, the printing apparatus 100 according to the present exemplary embodiment verifies the method for providing the cover with the user if the user has instructed the printing of the content job only. Accordingly, the present exemplary embodiment can prevent outputting of a print product of the content job without case-binding the content-block, which may occur due to an operation error by the user. Furthermore, if the user has instructed the printing of the cover job only, it is also useful if the printing apparatus 100 verifies the method for providing the content with the user. Accordingly, the present exemplary embodiment can prevent outputting the cover without case-binding the contentblock, which may occur due to an operation error by the user.

In the above-described embodiments of the present invention, the case binding processing is performed. However, the present invention is not limited to this. That is, the present invention can be implemented in performing gluing binding or saddle stitch binding processing on a cover and a content. Furthermore, the present invention is not limited to bookbinding processing for executing a cover job and a content job. That is, the present invention can be implemented in performing bookbinding processing for executing a content job and a sheet insertion job for inserting an insertion sheet.

In the above-described embodiments of the present invention, after performing a print setting for a bookbinding job, a content job, and a cover job via the case binding screen 1201, the PC 103 transmits the jobs whose print settings have been set to the printing apparatus 100. However, the present invention is not limited to this. That is, the user can input an instruction for executing a print job via the operation unit 204 of the printing apparatus 100. In this case, the control unit 205 displays an operation screen having a function substantially similar to that of the case binding screen 1201 on the operation unit 204 and receives the print setting set by the user via the operation screen.

The functions according to the above-described exemplary embodiments illustrated in the drawings can be implemented by a host computer (the PC 103 or the PC 104, for example) using a program that is externally installed. Note here in this case, data for displaying an operation screen similar to that described above in the embodiments of the present invention having each operation screen is externally installed to provide the above-described various UI screens on a display unit of the host computer. For example, the print setting screen 1001 described above can be used as an example of such an operation screen. Furthermore, in this case, the present invention is applied to the case where a group of information including a program is supplied to an output device from a computer-readable storage medium such as a compact disc-read only memory (CD-ROM), a flash memory, and a floppy disk (FD) or from an external computer-readable storage medium through a network.

The present invention is embodied in a program for a computer which on execution by a computer implements the functions of the invention described herein. The program may be carried on a carrier medium such as a computer-readable storage medium or a transmission medium (signal). The present invention can thus also be achieved by providing a system or an apparatus with a carrier medium such as a computer-readable storage medium storing program code of software implementing the functions of the embodiments and by reading and executing the program code stored in the computer-readable storage medium with a computer of the system or the apparatus (a CPU or a micro processing unit (MPU)).

In this case, the program code itself, which is read from the computer-readable storage medium, implements the functions of the embodiments described above, and accordingly, the computer-readable storage medium storing the program code constitutes the present invention.

Accordingly, the program can be configured in any form, such as object code, a program executed by an interpreter, and script data supplied to an operating system (OS).

As the computer-readable storage medium for supplying such program code, a floppy disk, a hard disk, an optical disk, a magneto-optical disk (MO), a compact disc read only memory (CD-ROM), a compact disc recordable (CD-R), a compact disc rewritable (CD-RW), a magnetic tape, a non-volatile memory card, a read only memory (ROM), and a digital versatile disc (DVD (DVD-recordable (DVD-R), DVD-rewritable (DVD-RW))), for example, can be used.

In this case, the program code itself, which is read from the computer-readable storage medium, implements the function of the embodiments mentioned above, and accordingly, the computer-readable storage medium storing the program code constitutes the present invention.

The above program can also be supplied by connecting to a web site on the Internet by using a browser of a client computer and by downloading the program from the web site as a signal to a computer-readable storage medium such as a hard disk. In addition, the above program can also be supplied by downloading a compressed file that includes an automatic installation function from the web site to a computer-readable storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can also be supplied by distributing a computer-readable storage medium such as a CD-ROM and the like which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the computer-readable storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

In addition, the present invention can be applied to a system including a plurality of devices and to an apparatus that includes one device. Furthermore, the present invention can be implemented by supplying a system or an apparatus with a program. In this case, by reading the carrier medium such as a computer-readable storage medium that stores a program described by software that can implement the present invention with the system or the apparatus, the system or the apparatus can implement the present invention. That is, the scope of the present invention is not limited to a specific description hereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-060076 filed Mar. 10, 2008, which is hereby incorporated by reference herein in its entirety.

What is claimed is:

1. A printing control apparatus comprising:
    a display unit configured to display a job list in which a plurality of jobs are included;
    an execution unit configured to execute a job which is selected by a user via the job list displayed on the display unit;
    a holding unit configured to hold a first cover job for printing a cover and a second cover job for printing another cover;
    a receiving unit configured to receive a content job for printing content; and
    a display control unit configured to control the content job to be displayed in association with the first cover job on the job list, in a case where the content job is received with first identification information identifying the first cover job, and configured to control the content job to be displayed in association with the second cover job on the job list, in a case where the content job is received with second identification information identifying the second cover job.

2. The printing control apparatus according to claim 1, wherein the display control unit is configured to control the content job and the first cover job to be displayed with a same number, in a case where the content job is received with first identification information, and configured to control the content job and the second cover job to be displayed with a same number, in a case where the content job is received with second identification information.

3. The printing control apparatus according to claim 1, further comprising:
an assigning unit configured to assign a reception number to each of the plurality of jobs included in the job list, wherein the first identification information is the reception number assigned to the first cover job, and the second identification information is the reception number assigned to the second cover job.

4. The printing control apparatus according to claim 1, further comprising:
a previewing unit configured to cause the display unit to display a preview image corresponding to a job which is selected by a user via the job list displayed on the display unit.

5. A method for controlling a printing apparatus which has a display unit configured to display a job list in which a plurality of jobs are included, and an execution unit configured to execute a job which is selected by a user via the job list displayed on the display unit, the method comprising:
holding, in a holding unit, a first cover job for printing a cover and a second cover job for printing another cover;
receiving a content job for printing content; and
controlling the content job to be displayed in association with the first cover job on the job list, in a case where the content job is received with first identification information identifying the first cover job, and controlling the content job to be displayed in association with the second cover job on the job list, in a case where the content job is received with second identification information identifying the second cover job.

6. A non-transitory computer readable storage medium storing a program for causing a computer to execute the method of claim 5.

\* \* \* \* \*